United States Patent
Reynolds et al.

(10) Patent No.: US 9,130,911 B2
(45) Date of Patent: *Sep. 8, 2015

(54) SYSTEM AND METHOD FOR ELECTRONIC SECURE OBFUSCATION NETWORK

(71) Applicant: CHICKASAW MANAGEMENT COMPANY, LLC, Reston, VA (US)

(72) Inventors: James Reynolds, Ashburn, VA (US); Brett Burley, Waterford, VA (US); Michael Howard, Lovettsville, VA (US); James Spagnoli, Lovettsville, VA (US); Gene Ward, Manassas, VA (US); Joseph Willey, Centreville, VA (US); Christopher Howland, Washington, DC (US); David Gutierrez, Ashburn, VA (US); Michael H. Howland, Middleburg, VA (US); Kip Walraven, Ashburn, VA (US); Derek Cole, Ashburn, VA (US); Joseph Robert Kenney, Aldie, VA (US)

(73) Assignee: Chickasaw Management Company, LLC, Reston, VA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/960,320

(22) Filed: Aug. 6, 2013

(65) Prior Publication Data

US 2014/0223170 A1     Aug. 7, 2014

Related U.S. Application Data

(60) Provisional application No. 61/759,857, filed on Feb. 1, 2013.

(51) Int. Cl.
 *H04L 29/06*   (2006.01)
 *H04L 12/707*  (2013.01)

(52) U.S. Cl.
 CPC ............ *H04L 63/0471* (2013.01); *H04L 45/24* (2013.01); *H04L 63/04* (2013.01); *H04L 63/18* (2013.01)

(58) Field of Classification Search
 CPC ............................. H04L 63/0428; H04L 29/06
 USPC ........................................................ 713/153
 See application file for complete search history.

(56) References Cited

U.S. PATENT DOCUMENTS

| | | | |
|---|---|---|---|
| 2008/0117836 A1* | 5/2008 | Savoor et al. ................. | 370/254 |
| 2012/0044936 A1* | 2/2012 | Bellagamba et al. ......... | 370/392 |
| 2013/0111038 A1* | 5/2013 | Girard ........................... | 709/226 |

* cited by examiner

*Primary Examiner* — Anthony Brown
(74) *Attorney, Agent, or Firm* — Alchemy-Partners, PC

(57) ABSTRACT

Described are a secure obfuscation network (SON) and ingress nodes, transit nodes and egress nodes used in such a network. Also described is a method for implementing such a network.

9 Claims, 19 Drawing Sheets

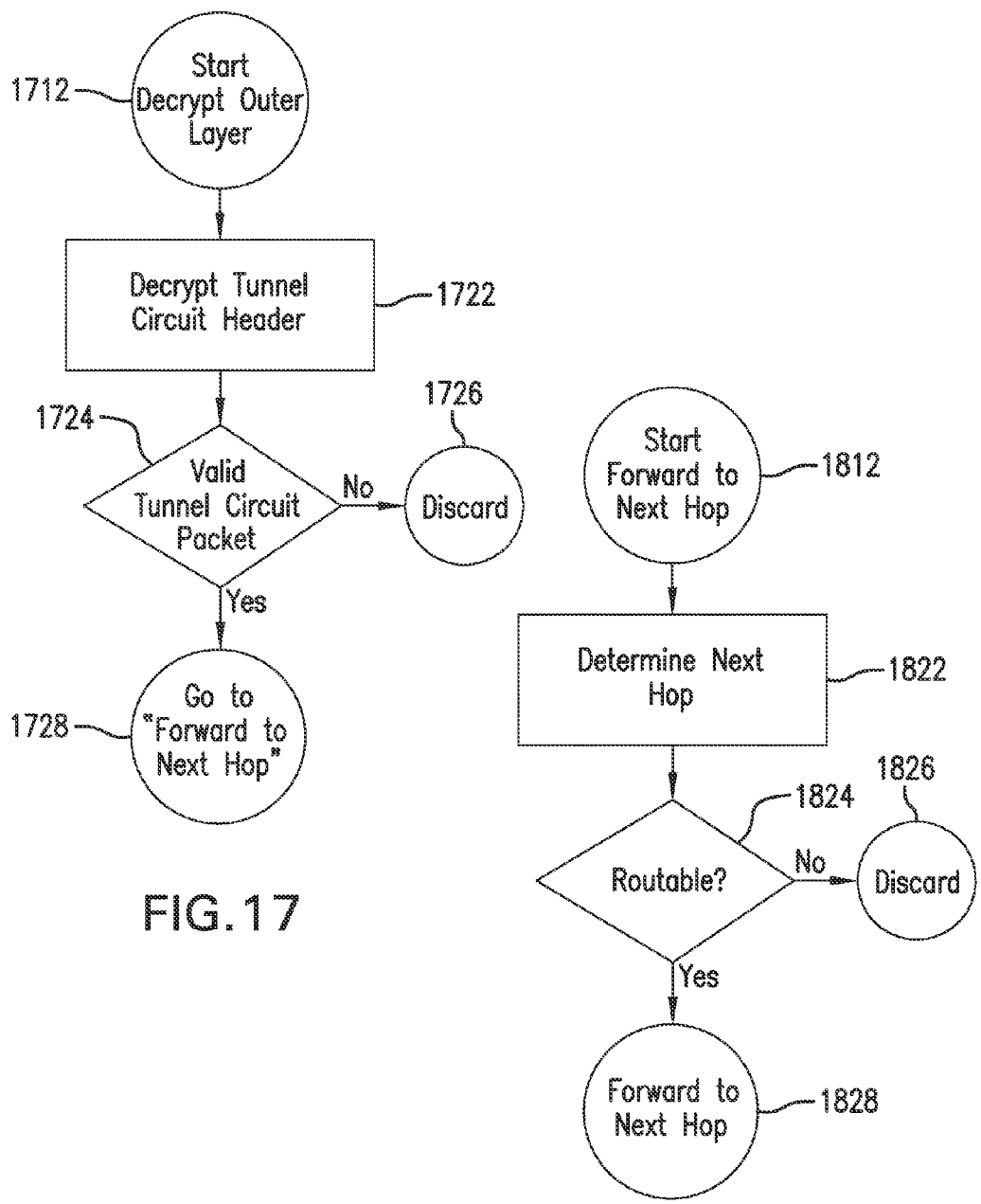

SYSTEM AND METHOD FOR ELECTRONIC SECURE OBFUSCATION NETWORK

CROSS-REFERENCE TO RELATED APPLICATION

This application claims benefit of priority to U.S. Provisional Patent Application No. 61/759,857, entitled "ENCRYPTION SYSTEM", filed Feb. 1, 2013, which is incorporated herein by reference in its entirety.

BACKGROUND

1. Field of the Invention

The present invention relates generally to computer hardware and software security/privacy and, more particularly, to the means of electronically protecting and masking the network location of the computer hardware.

2. Related Art

Today, nearly every computer has the capability to communicate over the Internet. Most commonly, the Internet is used today to allow a client at its origin to query and exchange information with a server (target). This typically is in the form of a personal computer or device accessing information on a public server or a corporate private server at another location. There is the need for users and companies to have private data transactions but would like the convenience of the ease of accessibility over the Internet. Most commonly, the use of secure point-to-point communication is used, such as VPN for users to access private company information. One of the drawbacks of Internet communication is the capability of third parties to monitor, breach and even imitate communication between the client and server. Given that the Internet location of both user and server are known, third parties also have the capability to discover the actual Internet location of both client and server devices, a capability that may be undesirable for user and public and/or private hosted servers. In addition, by discovering the actual network location of the server, the third party may have the capability to attack the server to gain access to consolidated information, which is valuable to the company's business.

SUMMARY

According to a first broad aspect, the present invention provides a device comprising: an ingress node comprising: a tunnel circuit builder module for building a tunnel circuit from the ingress node to an egress node, an ingressing user data redirection module for redirecting traffic from a client node to the tunnel circuit and for encrypting traffic to thereby form encrypted traffic, a send/receive module for sending traffic to and receiving traffic from the tunnel circuit, a private portion for allowing high bandwidth secure private traffic to be received and transmitted by the node on a private pathway through the ingress node, and a public portion for allowing low bandwidth secure public traffic to be received and transmitted by the node on a plurality of public pathways through the ingress node, wherein the tunnel circuit comprises a random route path through a plurality of randomly selected public-private transit nodes.

According to a second broad aspect, the present invention provides a method comprising the following steps: (a) forming a tunnel circuit from an ingress node to an egress node for traffic from a client node connected to the ingress node, (b) forming an egress tunnel from the egress node to a server for the traffic, and (c) transmitting the traffic from the client node to the egress node, wherein the tunnel circuit comprises a random route path through a plurality of randomly selected public-private transit nodes, wherein the egress tunnel is an inner tunnel of a double tunnel, wherein the tunnel circuit is an outer tunnel of the double tunnel, and wherein the ingress node includes a private portion for allowing high bandwidth secure private traffic to be received and transmitted by the ingress node on a private pathway through the node and a public portion for allowing low bandwidth secure public traffic to be received and transmitted by the ingress node on a plurality of public pathways through the ingress node.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the invention.

FIG. 17 is a flowchart illustrating the operation of a private circuit builder module of one of the public-private transit nodes of FIG. 10;

FIG. 18 is a flowchart illustrating the operation of a forwarding module of one of the public-private transit nodes of FIG. 10;

DETAILED DESCRIPTION OF THE PREFERRED EMBODIMENTS

Definitions

Figure 1:
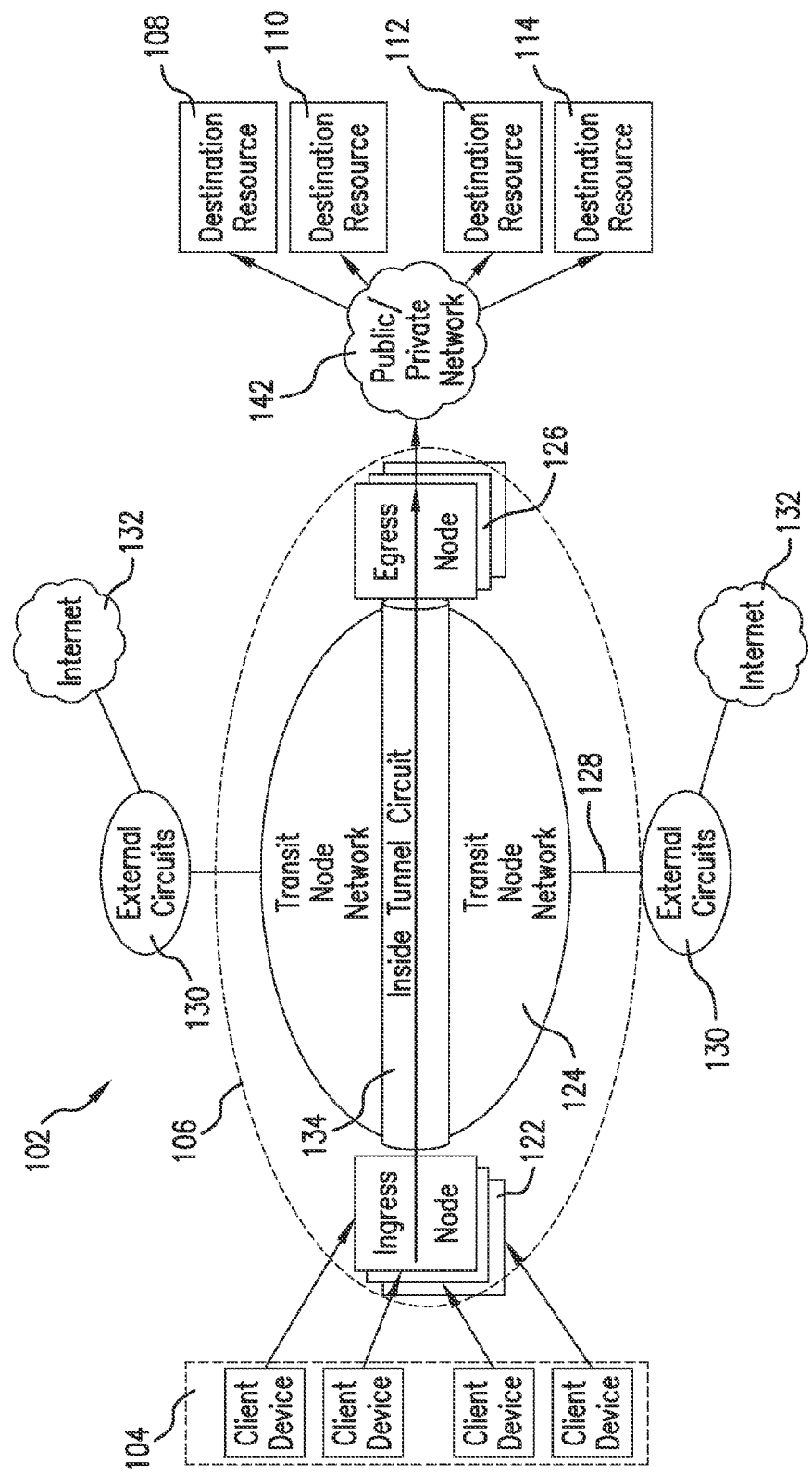
FIG. 1 is a schematic diagram of a secure obfuscation network (SON) according to one embodiment of the present invention.

Where the definition of terms departs from the commonly used meaning of the term, applicant intends to utilize the definitions provided below, unless specifically indicated.

For purposes of the present invention, directional terms such as "top," "bottom," "upper," "lower," "above," "below," "left," "right," "horizontal," "vertical," "upward," "downward," etc., are merely used for convenience in describing the various embodiments of the present invention.

For purposes of the present invention, the term "adversary" refers to a human who may either intentionally or unintentionally undermine the confidentiality, integrity, and/or availability of private electronic information.

For purposes of the present invention, the term "client device" and the term "source" unless specified otherwise, may be used interchangeably and refer to electronic devices that may be used to access a data network or a communication network. Examples of client devices include: personal computers, personal data assistants, cell phones, laptops, tablet computers, handheld gaming devices, video game players, etc. When an ingress node is part of a separate device that is not part of a client device, the terms "client device" and "client node" may be used interchangeably. However, in some embodiments of the present invention, such as that illustrated in FIG. 7, the client node may include a "client device" and an "ingress node."

For purposes of the present invention, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present invention may be carried out using a computer.

For purposes of the present invention, the term "data storage medium" or "storage medium" refers to any medium or media on which data may be stored for use by a computer system. Examples of data storage media include floppy disks, Zip™ disks, CD-ROM, CD-R, CD-RW, DVD, DVD-R, flash memory, hard disks, optical disks, etc.

For purposes of the present invention the term "destination resource" and the term "server," unless specified otherwise, may be used interchangeably and refer to the final termination point of the communication circuit initiated by a client application (e.g. web browser). When an egress node is part of a separate device that is not part of a server, the terms, "server" and "server node" may be used interchangeably. However, in some embodiments of the present invention, such as that illustrated in FIG. 7, the server node may include a "server" and an "egress node."

For purposes of the present invention, the term "digital hardware," the term "computer hardware" and the term "hardware" refer to the physical parts of a computer and related devices such as printed circuit boards, storage devices, memory, visual display devices, input devices, etc. The terms "digital hardware," "computer hardware" and "hardware" are used interchangeably for purposes of the present invention, unless specified otherwise.

For purposes of the present invention, the term "digital software," the term "computer software" and the term "software" refer programs and applications that are on computers and related devices. The terms "digital software," "computer software" and "software" are used interchangeably for purposes of the present invention, unless specified otherwise.

For purposes of the present invention, the term "double tunnel" refers to wrapping one logically and cryptographically discrete information circuit (an "inner tunnel," also referred to as the "egress tunnel") within another logically and cryptographically discrete information circuit (the "outer tunnel," also referred to as the tunnel circuit). In the double tunnel of the present invention, there are two (2) different encryptions: (1) point-to-point (node-to-node) encryption for the outer tunnel (the tunnel circuit) and (2) end-to-end (ingress-to-egress) encryption for the inner tunnel (the egress tunnel) that is passed inside the node-to-node encryption.

For purposes of the present invention, the term "egress node" refers to a node that reroutes encrypted traffic from a tunnel circuit to a server node and decrypts the encrypted traffic from a tunnel circuit prior to sending the traffic to the server node. An egress node may be part of a separate device or may be part of a server including the server node.

For purposes of the present invention, the term "external circuit" refers to any circuit that is not propagated through the private components of this invention.

For purposes of the present invention, the term "forward-looking mechanism" refers to the ability to locally manipulate circuit path creation decisions made by remote network components.

For purposes of the present invention, the term "hardware and/or software" refers to functions that may be performed by digital software, digital hardware, or a combination of both digital hardware and digital software.

For purposes of the present invention, the term "hidden service" refers to a client-server application hosted within the private secure transit system (STS) domain and made available to authorized clients, without the need to reveal the availability of the service to unauthorized clients.

For purposes of the present invention, the term "high bandwidth" refers to the allocation of a larger portion of a shared finite aggregate bandwidth resource to one pathway in comparison to one or more low bandwidth pathways.

For purposes of the present invention, the term "ingress node" refers to a node that reroutes traffic from a client node to a tunnel circuit and encrypts the traffic prior to sending the traffic to the tunnel circuit. An ingress node may be part of a separate device or may be part of a client device including the client node.

For purposes of the present invention, the term "local mechanism" refers to logical controls of the system that exist within the local operating environment of the individual components of which the invention is composed.

For purposes of the present invention, the term "logically adjacent node" refers to the node from which a given node receives private traffic and the node to which a given node sends private traffic. A tunnel circuit of the present invention is an ordered series of logically adjacent nodes.

For purposes of the present invention, the term "low bandwidth" refers to the allocation of a smaller portion of a shared finite aggregate bandwidth resource to one or more pathways in comparison to a larger portion being allocated to a high bandwidth pathway.

For purposes of the present invention, the term "mesh network" refers to having all routing nodes connected to all other routing nodes within the same network.

For purposes of the present invention, term the "microprocessor" refers to a computer processor contained on an integrated circuit chip, such a processor may also include memory and associated circuits. A microprocessor may further comprise programmed instructions to execute or control selected functions, computational methods, switching, etc. Various processes of the present invention may be carried out using a microprocessor.

For purposes of the present invention, the term "network" refers to a telecommunications system used to send and receive data.

For purposes of the present invention, the term "obscuring protocol" refers to an overt protocol that conceals hidden communication.

For purposes of the present invention, the term "onion router" refers to a device that employs multiple layers of encryption in order to provide confidentiality and anonymity.

For purposes of the present invention, the terms "private data stream" and "private internal data stream" refer to internal network communications intended to be hidden from public view.

For purposes of the present invention, the term "private ingress node" refers to an ingress node that is connected to other nodes only by private connections.

For purposes of the present invention, the term "public-private egress node" refers to an egress node that is a public-private node.

For purposes of the present invention, the term "public-private transit node" refers to a transit node that is a public-private node.

For purposes of the present invention, the terms "public data stream," "public external data stream" and "public traffic" refer to network communications originated from any public network, e.g., the Internet.

For purposes of the present invention, the term "public-private node" refers to a node including a private portion for sending and receiving secure private traffic and a public portion for sending and receiving secure public traffic. A public-private node may or may not include a throttle for adjusting the size of the public and/or private portions of the public-private node.

For purposes of the present invention, the terms "randomly relay traffic" and "randomly route traffic" refer to using methods that forward traffic through different communications paths that cannot be easily predicted.

For purposes of the present invention, the term "steganographic technique" refers to any technique or protocol that hides a concealed message in an unconcealed, overt message.

For purposes of the present invention, the term the term "storage medium" refers to any form of storage that may be used to store bits of information. Examples of storage include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc.

For purposes of the present invention, the term "throttle" refers to the controlled suppression of network traffic to conserve network resources.

For purposes of the present invention, the term "traffic" refers to traffic, one or more pieces of data, one or more data streams or one or more communications travelling through a network.

For purposes of the present invention, the term "traffic analysis" refers to the examination of network traffic in order to find specific information.

For purposes of the present invention, the term "traffic analysis attack" refers to examination of network traffic with intent to obtain identifying or otherwise private information about the end user that would not be overtly available.

For purposes of the present invention, the term "traffic mixing" refers to a server node acting as a proxy for multiple random data streams from many physically distributed locations that will proxy their traffic through the server, thereby making it difficult for any person who might want to track the origin of the sender.

For purposes of the present invention, the term "traffic shaping" refers to the ability for a server node to give higher priority of throughput to selected data streams and to give lower priority of throughput to the other data streams.

For purposes of the present invention, the term "transactional data" refers to data that is transmitted from one server node to the other.

For purposes of the present invention, the term "transit node" refers to a transit node/router whose sole purpose is to route traffic through it to another transit node or an egress node using a secure communications channel (but traffic will not be egressed outside the secure communications channel).

For purposes of the present invention, the term "tunnel circuit" refers to an end-to-end encrypted secure connection between an ingress node, two or more transit nodes and an egress node. A tunnel circuit of the present invention is an ordered series of logically adjacent nodes.

For purposes of the present invention, the term "visual display device," the term "visual display apparatus" and the term "visual display" refer to any type of visual display device or apparatus such as a an LCD screen, touchscreen, a CRT monitor, LEDs, a projected display, a printer for printing out an image such as a picture and/or text, etc. A visual display device may be a part of another device such as a spectrometer, a computer monitor, a television, a projector, a cell phone, a smartphone, a laptop computer, a tablet computer, a handheld music and/or video player, a personal data assistant (PDA), a handheld game player, a head mounted display, a heads-up display (HUD), a global positioning system (GPS) receiver, etc.

Description

Currently, there are methods and systems available that allow users to communicate over the Internet to their corporate server. One such system aims to protect its users and corporate servers from attack and eavesdropping by third parties. This technology is known as VPN (virtual private network).

Some known drawbacks to prior art VPN technology, however, are: (1) users connection to servers are point to point, (2) users and servers Internet address are exposed thus opening them up to third party attack. Given the desire of users and host servers to be protected against third party attack, VPN is an impractical solution and protecting private transactions is not truly achieved.

The present invention overcomes the above-identified shortcomings by providing communication to third-party systems by means of obscuring the Internet location of the initiating user and by obscuring the true Internet location of the target network. In one embodiment, the present invention provides a series of transit nodes to randomly relay and route communications traffic. In one embodiment of the present invention, private/secure internal data streams and public external data streams are mixed together using steganographic techniques to cover intentions of attempted anonymity. In one embodiment of the present invention, performance and availability of private streams is ensured by using a traffic shaping technique. In one embodiment of the present invention, a double tunnel technique is used to hide the true origin of a data stream, thereby enhancing the confidentiality of the data stream.

FIG. 1 shows a secure obfuscation network (SON) 102 according to one embodiment of the present invention. SON 102 includes client devices 104, a secure transit system (STS) 106, and one or more destination resources 108, 110, 112 and 114. STS 106 includes public-private ingress nodes 122, a private transit node network 124 and public-private egress nodes 126. Private transit node network 124 comprises public-private transit nodes that are connected to each other by high bandwidth secure connections. The public-private transit nodes of private transit node network 124 are also connected by less secure lower bandwidth connections 128 to less secure nodes in external circuits 130 that are connected to the Internet 132. A number of the public-private transit nodes of private transit node network 124 form an inside tunnel circuit 134 between one of public-private ingress nodes 122 and one of public-private egress nodes 126. That is, the public-private transit nodes form a secure pathway between one of public-private ingress nodes 122 and one of public-private egress nodes 126 that is unaffected by data/communication in external circuits 130 and between external circuits 130 and the public-private transit nodes of private transit node network 124. Client devices 104 are connected to one of randomly selected ingress nodes. Destination resources 108, 110, 112 and 114 are connected through public-private network 142 to one of multiple available corresponding public-private egress nodes 126.

The client devices of a SON may be of varying type such as personal computers, laptops, tablets, laptops, cell phones, smartphones, landline phones, etc. Although, for simplicity of illustration, four client devices are shown in FIG. 1, there may be one, two or any other number of client devices in a SON.

In at least some embodiments of the present invention, to gain access to the SON, a user must provide some means of authentication through a client device or through a device associated with the client device that the user is authorized to access the SON. For example, a user may type number of an RSA key into the client device, the user may use the client device to provide a password, a biometric sensor in the client device or in communication with the client device and/or the SON may be used to authenticate the user's identity based on a user's fingerprint, palm, face, retina, voice, or other biometric authentication method.

Although, for simplicity of illustration, four destination resources are shown in FIG. 1, there may be any number of destination resources.

For simplicity of illustration, FIGS. 2, 3, 4, 5, 6, 7, 8, 9, 10, 11, 12, 13, 14, 15, 16, 17, 18, 19, 20 and 21 describe various features of the present invention with respect to a SON including one client, one ingress, one egress and one destination resource. However, a SON of the present invention may include multiple clients, ingresses, egresses and destination resources.

Figure 2:
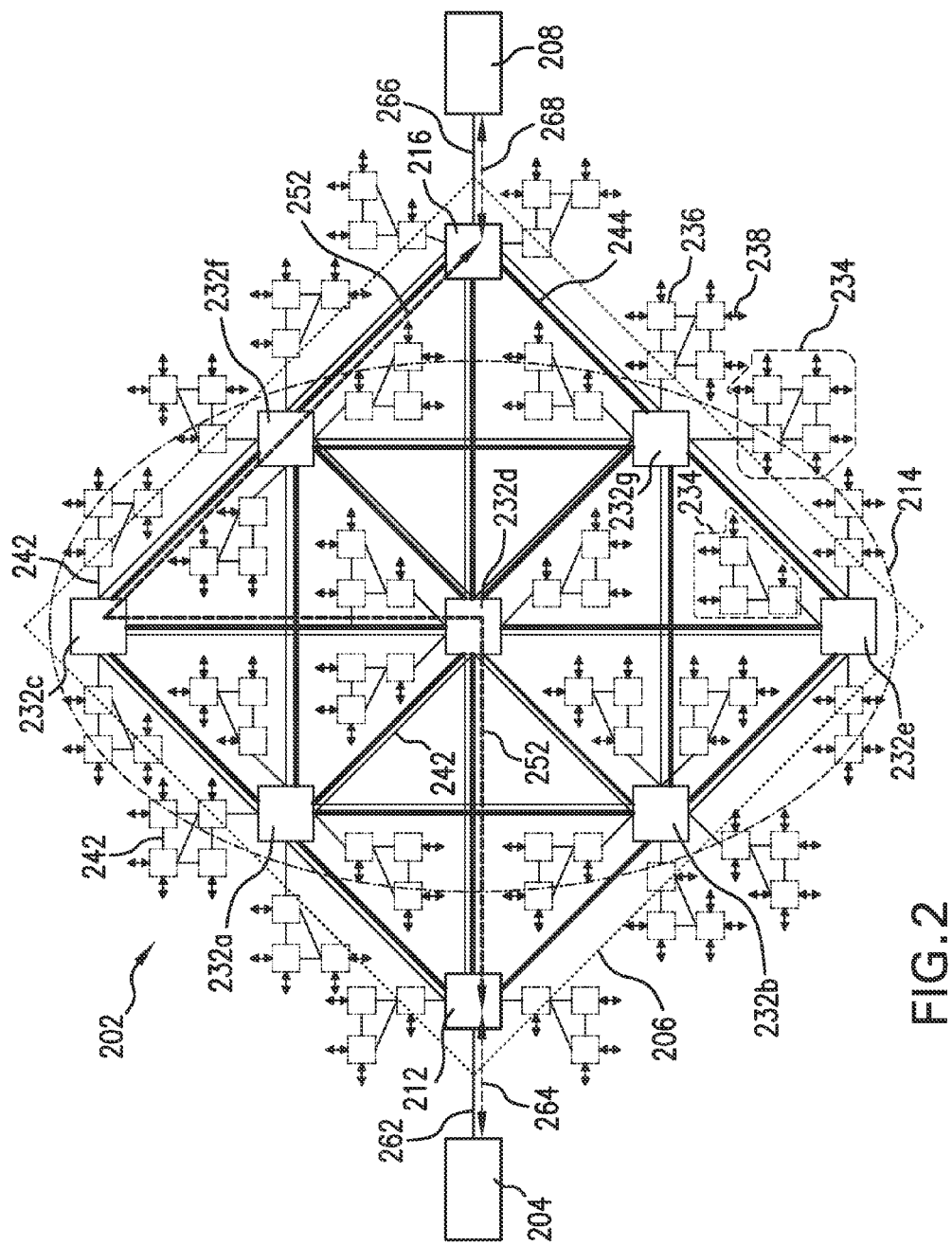
FIG. 2 is a schematic diagram of part of a secure obfuscation network according to one embodiment of the present invention showing an inside tunnel circuit from a source/client device to a destination resource.

FIG. 2 shows part of a SON 202 according to one embodiment of the present invention. SON 202 includes a client device 204, a STS 206 and a destination resource 208. STS 206 includes a public-private ingress node 212, a public-private transit node network 214 and a public-private egress node 216. Client device 204 is connected to public-private ingress node 212. Destination resource 208 is connected to public-private egress node 216. Private transit node network 214 comprises public-private transit nodes 232a, 232b, 232c, 232d, 232e, 232f and 232g. Private transit node network 214 public-private ingress node 212 and public-private egress node 216 are embedded in and connected to public external circuits 234 consisting of public nodes 236 (shown as small boxes). Double-headed arrows 238 show that public nodes 236 are connected to additional public nodes, not shown in FIG. 2, of public external circuits 234. Public connections 242 connect public-private transit nodes 232a, 232b, 232c, 232d, 232e, 232f and 232g with each other, connect public-private transit nodes 232a, 232b, 232c, 232d, 232e, 232f and 232g with public nodes 236 and connect public nodes 236 with each other. Public-private transit nodes 232a, 232b, 232c, 232d, 232e, 232f and 232g are connected with each other and also with public-private egress node 216 by private connections/attachments 244. Private connections/attachments 244 are shown with thick lines to indicate high bandwidth allocation. Public connections 242 are shown with thinner lines to indicate lower bandwidth allocation. High bandwidth private traffic travels from public-private ingress node 212 to public-private egress node 216 in an inside tunnel circuit, shown by thick dashed arrow 252, which comprises private connections/attachments 244 between public-private transit nodes 232d, 232c and 232f. In the tunnel circuit shown by thick dashed arrow 252, public-private transit node 232d is logically adjacent to public-private transit node 232c, public-private transit node 232c is logically adjacent to public-private transit nodes 232d and 232f and public-private transit node 232f is logically adjacent to public-private transit node 232c. High bandwidth private traffic enters public-private ingress node 212 from source/client device 204 over a private connection 262 as shown by thin dashed arrow 264. High bandwidth private traffic is sent by public-private egress node 216 to destination resource 208 over a private connection 266 as shown by thin dashed arrow 268. Private traffic travels in both directions through inside tunnel circuit and over private connections 262 and 266 as shown by double-headed dashed arrows 252, 264 and 268, respectively.

For simplicity of illustration, not all of the private connections/attachments between public-private transit nodes are shown in FIG. 2. In one embodiment of the present invention, every public-private transit node of a private transit node network is securely connected/attached to every other public-private transit node in the public-private transit node network. Also, every public-private transit node may be securely connected to the public-private ingress node and/or the public-private egress node. For simplicity, in the discussion below, it will be assumed that all of the transit nodes of the security transit node network are securely connected to each other and to the public-private ingress node and the public-private egress node. However, this may not be the case in all embodiments of the present invention.

Also, for simplicity of illustration, only a limited number of public nodes and public connections are shown in FIG. 2. For example, there may be millions or billions of public nodes in a network. Also, each public-private transit node, public-private ingress node, public-private egress node or public node may have many public connections to other nodes in the network.

In a STS of the present invention, such as the STS shown in FIG. 2, the public-private ingress node, the public-private transit nodes, and the public-private egress node work independently to provide traffic mixing and traffic shaping. A successful traffic analysis attack may reveal various characteristics of networking activity that may be helpful to an adversary. Traffic mixing is employed by the STS to mitigate the risk of traffic analysis in those areas where STS traffic may be observable to an adversary. In FIG. 2, the concept of traffic mixing is illustrated by the external circuits and the inside tunnel circuit simultaneously converging on and diverging from the public-private transit nodes, public-private ingress nodes and the public-private egress node. The way traffic mixing is accomplished is a defining characteristic of the STS solution. A STS achieves traffic mixing by simultaneously running multiple instances of the obscuring protocols on all ingress, transit and egress nodes. Of the multiple instances of the obscuring protocols, one or more instances are private and used for the inside tunnel circuit and, depending on the level of traffic mixing required, one or more instances of the obscuring protocols remains available for public use. As a direct result of the STS, traffic mixing, private, inside tunnel circuit traffic is hidden within much larger amounts of public traffic, and mitigating the risk of traffic analysis. Traffic mixing produces large volumes of network traffic, a byproduct that must be managed in order to ensure that the limited resources of the STS nodes, i.e., public-private transit nodes, public-private ingress nodes and public-private egress nodes are always available and biased toward the inside tunnel circuit. To this end, STS utilizes a technique known as traffic shaping.

The method in which STS achieves traffic shaping is distinct in that it employs both forward-looking and local mechanisms. The obscuring protocol inherently accommodates forward-looking traffic shaping through parameters that are used to essentially advertise to the public the amount of bandwidth they will be allocated through the STS, subsequently affecting public users' circuit provisioning decisions. Local mechanisms for traffic shaping operate at the kernel-level of the operating system, allocating bandwidth to certain TCP and/or UDP services, protocols, public nodes, IP addresses and other network parameters. Specifically, the local mechanisms are tuned to reserve the bulk of available bandwidth for the inside tunnel circuit.

One additional, important concept represented within FIG. 2 is the ability of STS to dynamically provision the inside tunnel circuit. Using heuristic mechanisms and various configuration parameters, a STS dynamic provisioning helps ensure high availability and high performance of the inside tunnel circuit. The public-private transit node network is a mesh network created by having every node attached to every other node within the STS environment. These attachments are created logically, not physically, across the Internet. An inside tunnel circuit is then established across these logical attachments heuristically based on node availability (i.e., online), node reliability (i.e., uptime), and performance (i.e., throughput levels) and other available network specific characteristics, as well as other biasing parameters that may be set manually, resulting in optimal routing of the inside tunnel circuit.

Figure 3:
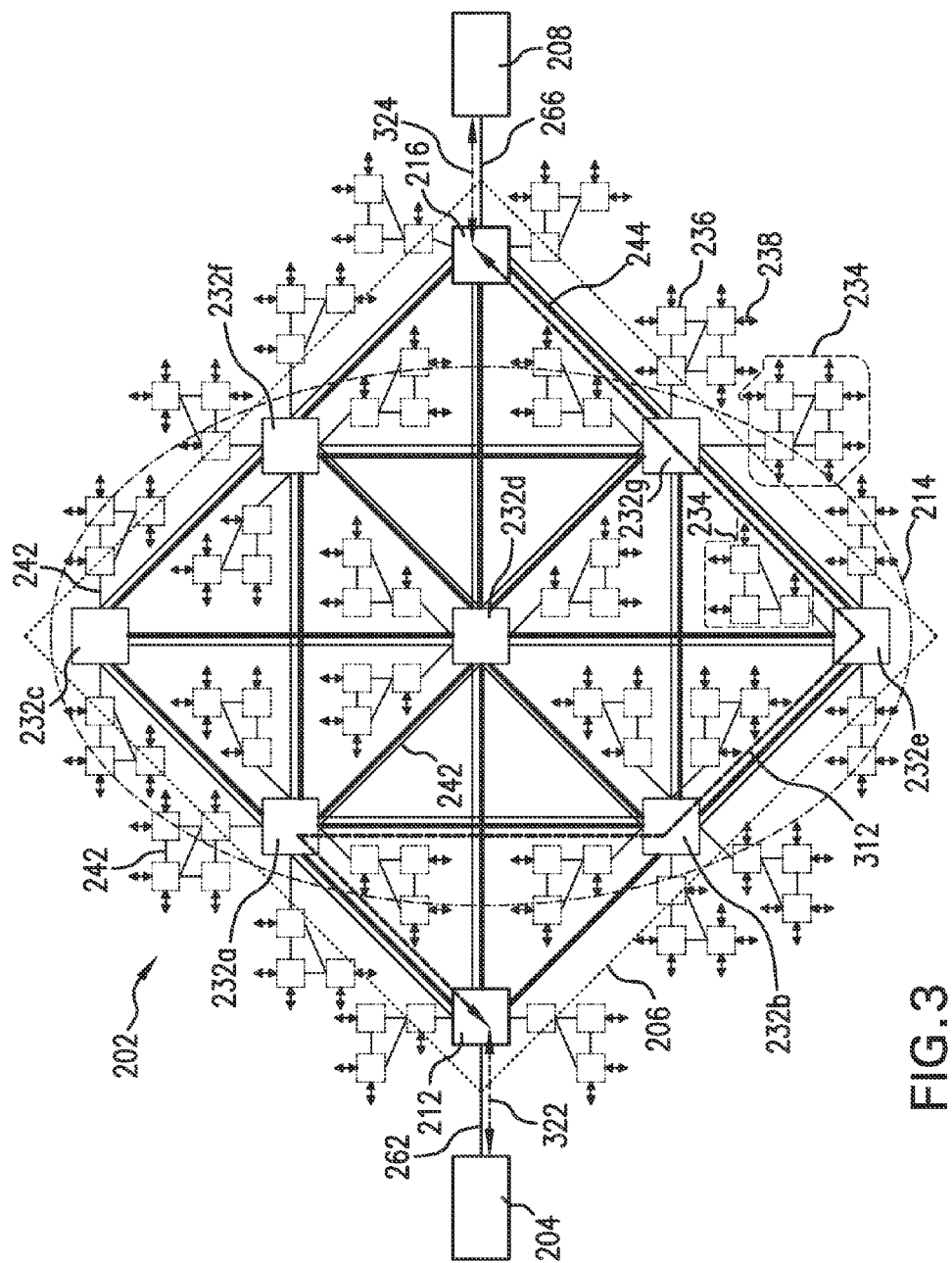
FIG. 3 a schematic diagram of part of the secure obfuscation network of FIG. 2 showing an inside tunnel circuit from a destination resource to a source/client.

FIG. 3 shows one example of an inside tunnel circuit, shown by thick dashed arrow 312, for high bandwidth private traffic that travels between source/client device 204 and destination resource 208 that passes through public-private transit nodes 232a, 232b, 232e and 232g, none of which are passed through by the inside tunnel circuit of FIG. 2. As shown in FIG. 3, the high bandwidth private traffic may travel in both directions between source/client device 204 and destination resource 208. High bandwidth secure traffic enters public-private ingress node 212 from source/client device 204 over private connection 262 as shown by thin dashed arrow 322. High bandwidth secure traffic is sent by public-private egress node 216 to destination resource 208 over private connection 266 as shown by thin dashed arrow 324. In the tunnel circuit shown by thick dashed arrow 312, public-private transit node 232a is logically adjacent to public-private transit node 232b, public-private transit node 232b is logically adjacent to public-private transit nodes 232a and 232e, public-private transit node 232e is logically adjacent to public-private transit nodes 232b and 232g and public-private transit node 232g is logically adjacent to public-private transit node 232e.

Figure 4:
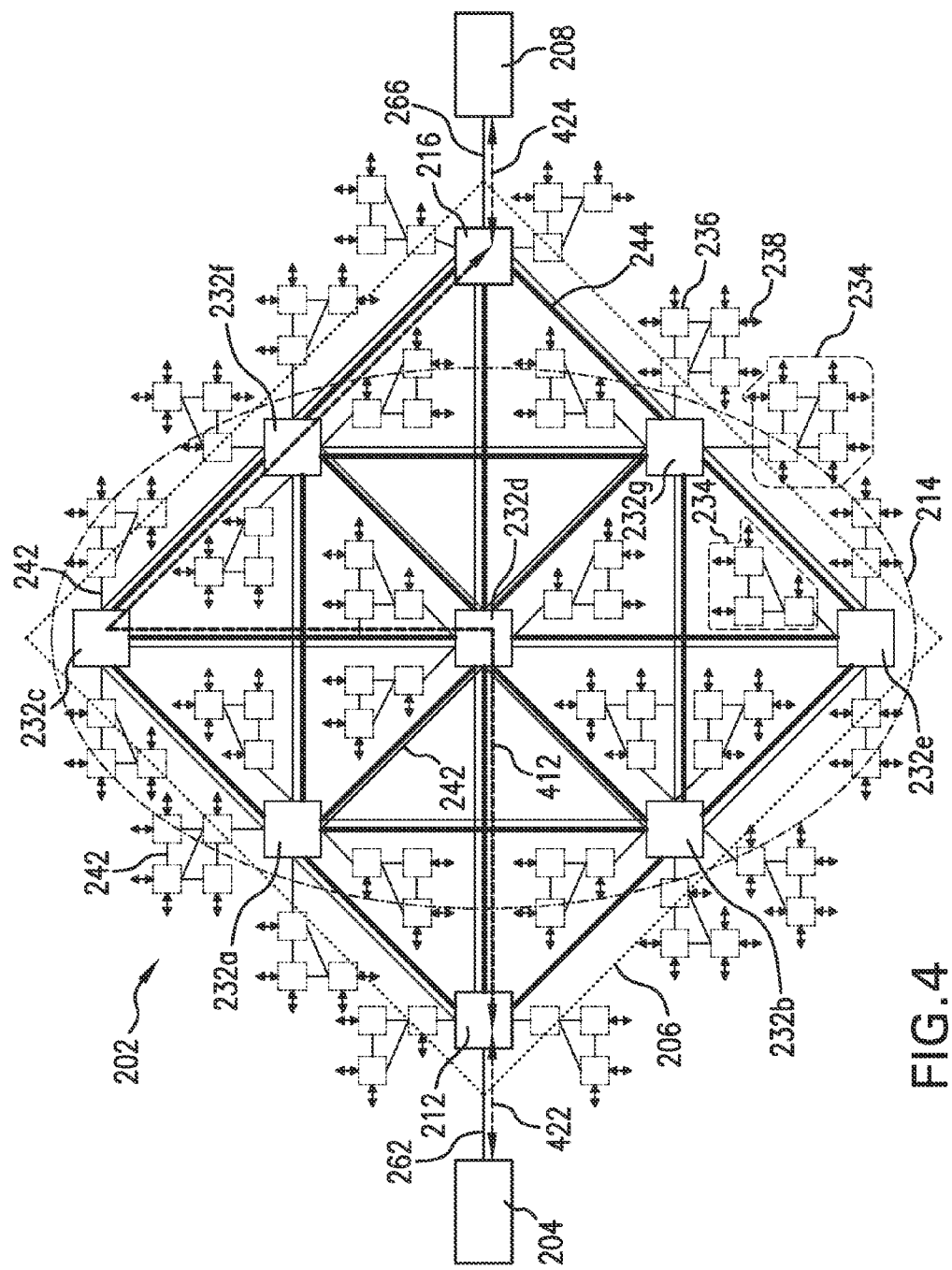
FIG. 4 is a schematic diagram of part of the secure obfuscation network of FIG. 2, showing an inside tunnel circuit from a destination resource to a source/client.

FIG. 4 shows an inside tunnel circuit, shown by thick dashed arrow 412, for high bandwidth private traffic that travels between source/client device 204 and destination resource 208 and uses some of the transit nodes (public-private transit nodes 232d and 232f) used by the inside tunnel circuit of FIG. 2 as well as public-private transit node 232g. As shown in FIG. 4, the high bandwidth secure traffic may travel in both directions between source/client device 204 and destination resource 208. High bandwidth secure traffic enters public-private ingress node 212 from source/client device 204 over private connection 262 as shown by thin dashed arrow 422. High bandwidth secure traffic is sent by public-private egress node 216 to destination resource 208 over private connection 266 as shown by thin dashed arrow 424. In the tunnel circuit shown by thick dashed arrow 412, public-private transit node 232d is logically adjacent to public-private transit node 232c, public-private transit node 232c is logically adjacent to public-private transit nodes 232d and 232f and public-private transit node 232f is logically adjacent to public-private transit node 232c.

As can be seen in FIGS. 2, 3 and 4, there are many potential inside tunnel circuits for a given private transit node network between the source/client device to the destination resource and from the destination resource to the source/client device. There are also numerous other inside tunnel circuits that could be used in both directions between the client device and the destination resource. In addition, because each of the public-private transit nodes is logically connected/attached to each of the other public-private transit nodes, the inside tunnel circuits are not limited by the connections shown in FIGS. 2, 3 and 4. For example, from the drawings in FIGS. 2, 3 and 4 its appears that a tunnel circuit must include a connection from public-private transit node 232d, 232f or 232g to public-private egress node 216, because only these three nodes are shown connected to public-private egress node 216. However, this is the result of illustrating only some of the logical connections between the transit nodes, egress node and ingress node for simplicity of illustration. In fact, public-private transit nodes 232a, 232b, 232c and 232e are also logically connected/attached to public-private ingress node 212 and public-private egress node 216. Whether two nodes that are logically connected to each other are logically adjacent to each other in a given tunnel circuit is dependent on the particular sequence of nodes in that tunnel circuit. Also, although the inside tunnel circuits of FIGS. 2, 3 and 4 are each shown operating in only one direction from the source/client device to the destination server or from the destination server to the source client device, each of these inside tunnel circuits could operate in either direction, depending on whether the traffic originates at the source/client device or the destination server.

Figure 5:
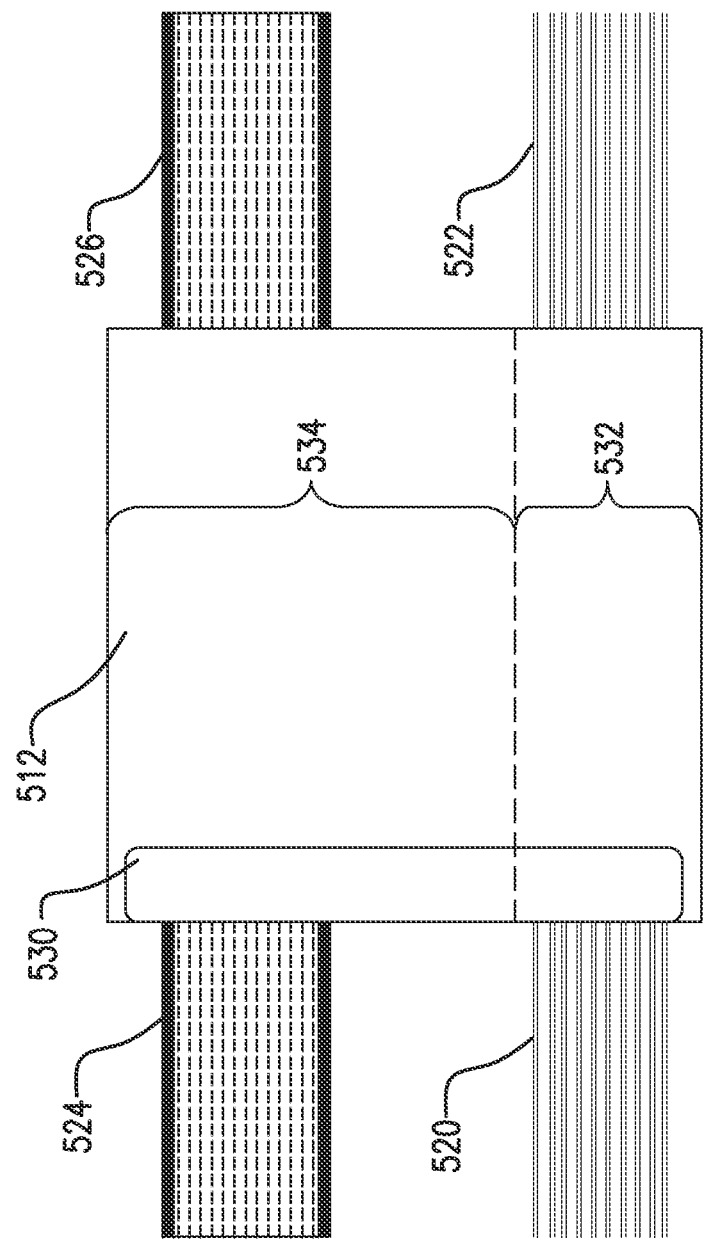
FIG. 5 is a schematic diagram of a public-private node according to one embodiment of the present invention.
Figure 6:
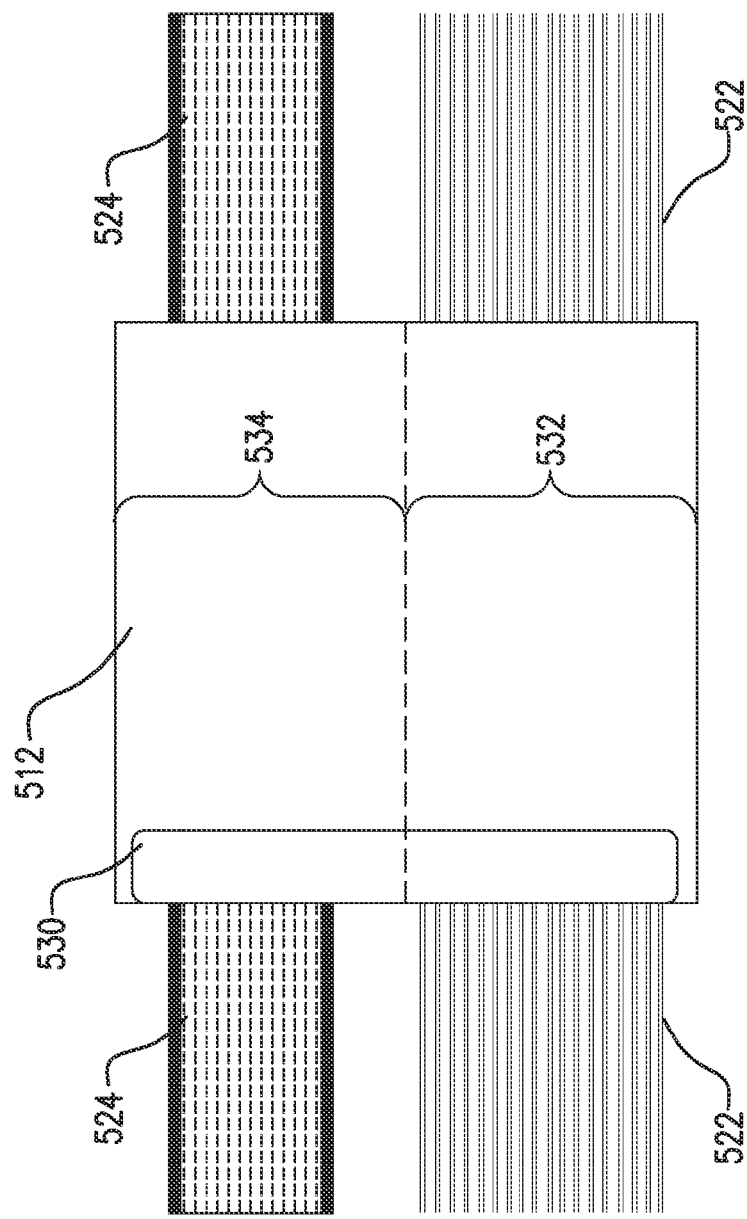
FIG. 6 is a schematic diagram of the public-private node of FIG. 5 illustrating the operation of a throttle for the node.

FIG. 5 shows a public-private node 512 according to one embodiment of the present invention. Public-private node 512 may be a transit node, ingress node, an egress node, a combination of transit node and an ingress node, a combination of transit node and an egress node, a combination of an ingress node and an egress node, or a combination of a transit node, an ingress node and a egress node. FIG. 5 includes many low-bandwidth public traffic connections 520 and 522 that connect to public-private node 512, only a small fraction of which are shown for simplicity of illustration. A combination of low-bandwidth public traffic connection 520 and low-bandwidth public traffic connection 522 form a low-bandwidth public pathway through public-private node 512 for public traffic, i.e., public traffic is received and sent by public-private node 512 using low-bandwidth public traffic connections 520 and 522. High-bandwidth private traffic connections 524 and 526 are also connected to public-private node 512. Together, high-bandwidth private traffic connections 524 and 526 provide a high-bandwidth private pathway through public-private node 512, i.e., private traffic is sent and received by public-private node 512 using high-bandwidth private traffic connections 524 and 526. Public-private node 512 includes a throttle 530 that controls the bandwidth allotted to, and number of simultaneous connections allowed, to low bandwidth public portion 532 of public-private node 512. Thereby, throttle 530 also controls the size of a high bandwidth private portion 534 of public-private node 512. The initial sizes of low bandwidth public portion 532 and high bandwidth private portion 534 may be set before or after public-private node 512 is connected to a private transit node network. In general, throttle 530 ensures that bandwidth allocated to private portion 534 is sufficient that private traffic may pass through public-private node 512 unimpeded. Throttle 530 may allow for additional bandwidth to be allocated to a low bandwidth public portion 532, if high-bandwidth private traffic connections 524 and 526 do not require the additional bandwidth. Such a reallocation of bandwidth is shown in FIG. 6 in which additional bandwidth is allocated to low bandwidth public portion 532 and less bandwidth is allocated to high bandwidth private portion 534.

Low-bandwidth public traffic connections 520 and 522 are each capable of being used to send and receive low-bandwidth public traffic. High-bandwidth private traffic connections 524 and 526 are each capable of being used to send and receive high-bandwidth private traffic.

Figure 7:
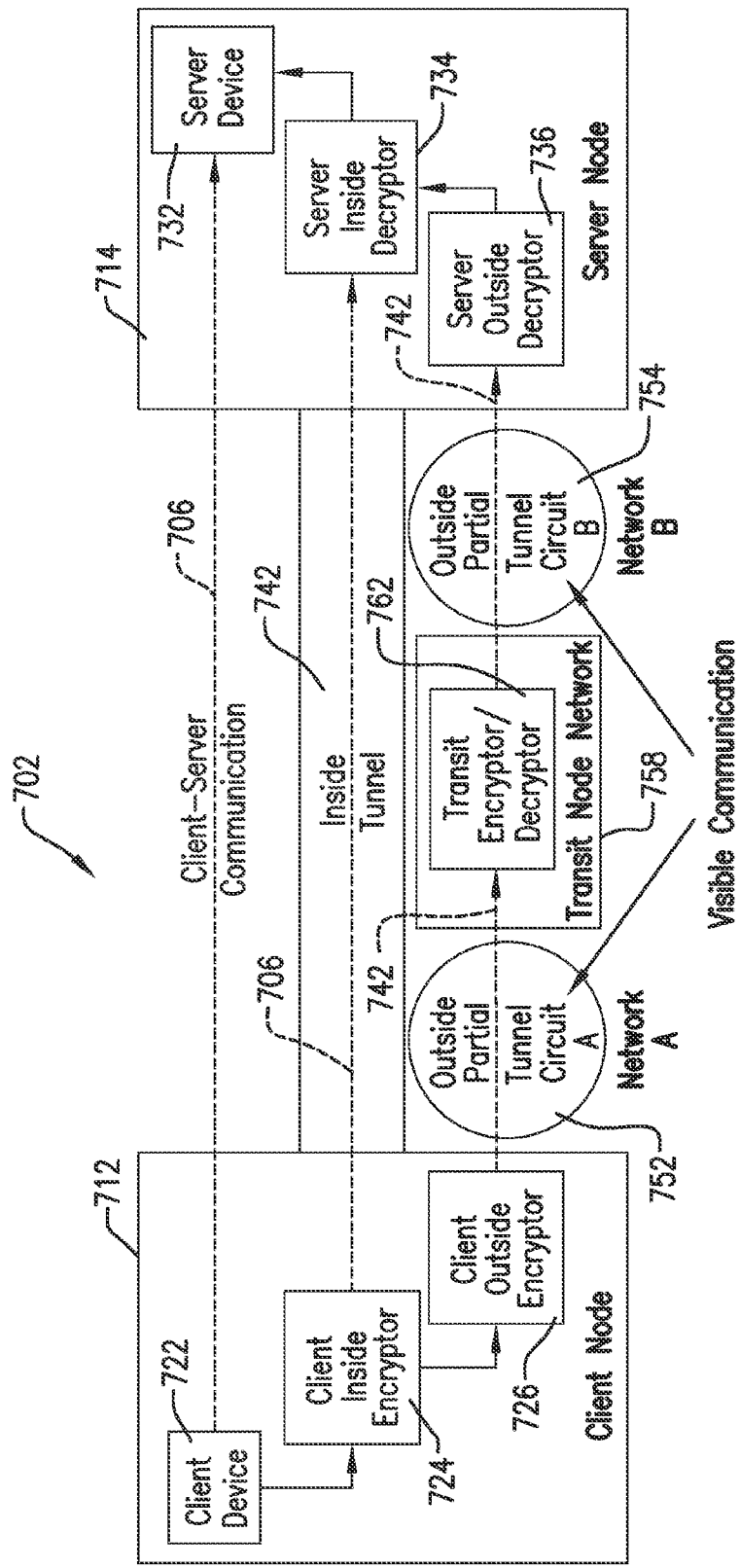
FIG. 7 is a schematic diagram illustrating how secure double tunneling works in a secure obfuscation network.

The throttle of the present invention may operate to adjust the size of the public portion of a node by limiting the number of new connections to that node and/or limiting the network resources that can be consumed by new connections. FIG. 7 shows how secure double tunneling works in a secure obfuscation network, SON 702, according to one embodiment of the present invention. Double tunneling serves the purpose of concealing a client-server communication 706 between a client node 712 and a server node 714. Client node 712 includes a client device 722, a client inside encryptor 724, and a client outside encryptor 726. Server node 714 includes a server device 732, a server inside decryptor 734, and a server outside decryptor 736. As shown in FIG. 7, client-server communication 706 between client node 712 and server node 714 is encapsulated between client inside encryptor 724 and server inside decryptor 734 using inside tunnel 742. When a client communication from client device 722 is received by client inside encryptor 724, client inside encryptor 724 initiates inside tunnel 742 between client inside encryptor 724 and server inside decryptor 734. Inside tunnel 742 conceals client-server communication 706 using encryption. The objective of concealing client-server communication 706 is further accomplished by encapsulating inside tunnel 742 inside an additional layer of tunneling by means of a pair of encrypted outside partial tunnel circuits 752 and 754 for two networks, Network A and Network B, respectively. As shown in FIG. 7, Network A represents the communication network between client node 712 and transit node network 758, and Network B represents the separate communication network between transit node network 758 and server node 714. Transit node network 758 separates outside partial tunnel circuit 752 and outside partial tunnel circuit 754 in order to conceal inside tunnel 742. Inside tunnel 742 is concealed because it is encapsulated within outside partial tunnel circuits 752 and 754. Therefore, the only visible communication is between client node 712 and transit node network 758, and transit node network 758 and server node 714, as shown. (There is no direct relationship between 712 and 714). Outside partial tunnel circuit 752 is initiated at client node 712 by client outside encryptor 724. Outside partial tunnel circuit 752 is terminated at transit node network 758 by transit node encryptor/decryptor module 762. Transit node encryptor/decryptor module 762 in turn initiates outside partial tunnel circuit 754 to server node 714 and server outside decryptor 736. Once outside partial tunnel circuit 754 is decrypted by server outside decryptor 736, inside tunnel 742 is in turn decrypted by the server inside decryptor 734. Client-server communication from client device 722 then arrives at the server device 732 unencrypted.

Each of the modules of the secure obfuscation network of FIG. 7 comprises digital hardware and/or software.

The traffic of the present invention is hidden from public view by a "double tunnel" The first of the "tunnels" of the "double tunnel" is the "inside tunnel," i.e., the inside tunnel that defines a pathway through the public-private transit nodes. The inside tunnel may also be referred to as an "egress tunnel." The second of the tunnels is an outside tunnel or "outer tunnel" formed by the pair of outside partial tunnel circuits. In a shared network environment, the source and destination information of each outside tunnel circuit can be seen by any entity with visibility into the network. However, the inside tunnel, and accordingly, the communication between the client and server, is completely encapsulated within the outside tunnel formed by the outside tunnel circuits. Because the direct connection between the client and server is not directly associated with the outside tunnel circuits, the direct connection is not visible or reconcilable to the outside world.

Although the ingress node is shown being part of client device in FIG. 7, the ingress node may be a separate device that is connected to the client device/client node. Although the egress node is shown being part of the server device in FIG. 7, the egress node may be a separate device that is connected to the server/server node.

Figure 8:
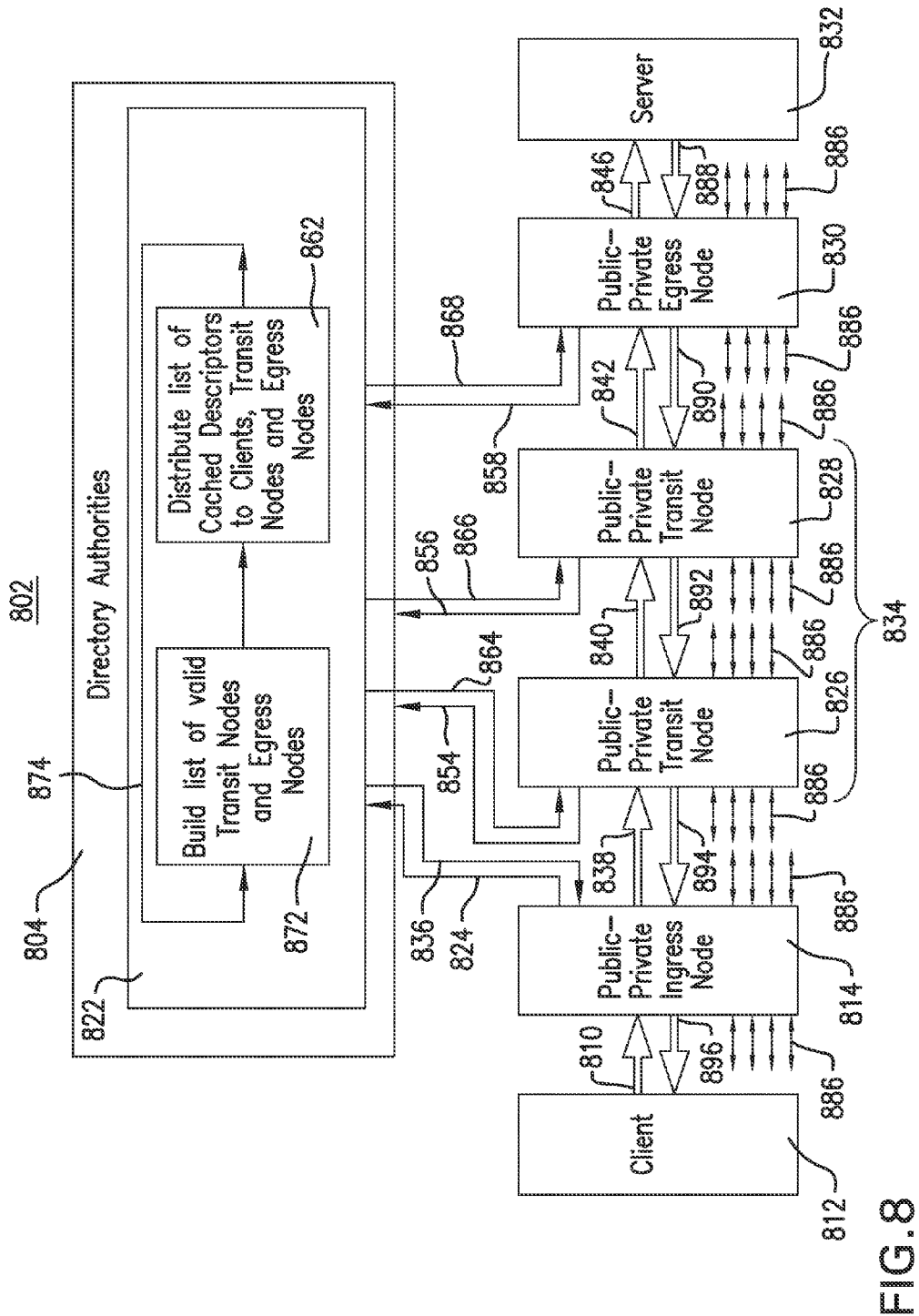
FIG. 8 is a schematic diagram illustrating end-to-end communication and data flow through a secure obfuscation network according to one embodiment of the present invention.

FIG. 8 shows an overview of end-to-end communication and data flow through a secure obfuscation network, SON 802, according to one embodiment of the present invention. SON 802 includes directory authorities 804. A client communication, indicated by arrow 810, is received from client 812 by a public-private ingress node 814. Public-private ingress node 814 queries a directory authority node 822 of directory authorities 804 with a query, as indicated by arrow 824, to determine the valid transit nodes, i.e., public-private transit node 826, public-private transit node 828 and public-private egress node 830, to use in forwarding the client communication securely to a server 832. Directory authority node 822 determines the valid transit nodes and egress node, i.e., public-private transit nodes 826 and 828 and public-private egress node 830, that are part of a tunnel circuit 834 for the client communication. Once public-private ingress node 814 obtains the aforementioned information from directory authority node 822, as indicated by arrow 836 public-private ingress node 814 forms an encrypted circuit segment with a valid transit node, i.e., public-private transit node 826, as indicated by thick arrow 838. From public-private transit node 826, the client communication is securely forwarded, as indicated by thick arrow 840, to public-private transit node 828. From public-private transit node 828, the client communication is securely forwarded, as indicated by thick arrow 842, to public-private egress node 830. Upon reaching public-private egress node 830, the communication is ultimately decrypted and forwarded, as indicated by thick arrow 846, to server 832. Before directory authority node 822 can determine that public-private ingress node 814, public-private transit node 826, public-private transit node 828 and public-private egress node 830 may be part of tunnel circuit 834, public-private ingress node 814, public-private transit node 826, public-private transit node 828 and public-private egress node must introduce themselves to directory authority node 822, as shown by arrows, 824, 854, 856 and 858. Public-private ingress node 814 queries directory authority node 822 as indicated by arrow 824 before public-private ingress node 814 decides what the random transit node circuit public-private ingress node 814 should build.

FIG. 8 also shows the operation of the directory authority node 822. The directory authority is constantly receiving updates from all public-private ingress, public-private transit and public-private egress nodes. The update information that is received consists of network parameters that indicate the status and health of the node. Based on the information directory authority node 822 collects from the nodes, directory authority node 822 then compiles a consolidated list of available nodes that can be used for ingress, transit or egress nodes and puts this information in a cached descriptors file. Directory authority node 822 distributes cached descriptors for the random route path listing as shown in box 862. In FIG. 8, this distribution of cached descriptors to public-private ingress node 814, public-private transit node 826, public-private transit node 828 and public-private egress node 830 is shown by arrows 836, 864, 866 and 868, respectively.

Directory Authority node 822 constantly repeats building a valid list of nodes (box 872) and distributes the list of cached descriptors (box 862) as shown by arrow 874. Each of the modules of the directory authority node 822 comprises digital hardware and/or software.

Public-private ingress nodes 814, Public-private transit node 826, public-private transit node 828 and public-private egress node 830 are also connected to public circuits, shown by double-headed arrows 886.

Thick arrows 888, 890, 892, 894 and 896 show secure communications from server 832 back to client 812.

For simplicity of illustration, only two transit nodes are shown in FIG. 8. However, in a Secure obfuscation network of the present invention, there may be many transit nodes that are part of a tunnel circuit, so that the secure communication travels through a number of public-private transit nodes between the private ingress node and a given public-private egress node.

For simplicity of illustration, only one ingress node is shown in FIG. 8. However, in a secure obfuscation network of the present invention, there may be many ingress nodes that are part of a tunnel circuit, so that the secure communication travels can be initiated through a number of public-private ingress nodes between the public private transit nodes and a given public-private egress nodes.

For simplicity of illustration, only one egress node is shown in FIG. 8. However, in a secure obfuscation network of the present invention, there may be many egress nodes that are part of a tunnel circuit, so that the secure communication travels can travel through a number of public-private egress nodes from any given public-private ingress and transit nodes.

For simplicity of illustration, only one destination resource is shown in FIG. 8. However, in a Secure obfuscation network of the present invention, there may be multiple destinations/servers. Therefore, the destination resource of FIG. 8 may be one of a number of destinations/servers.

Figure 9:
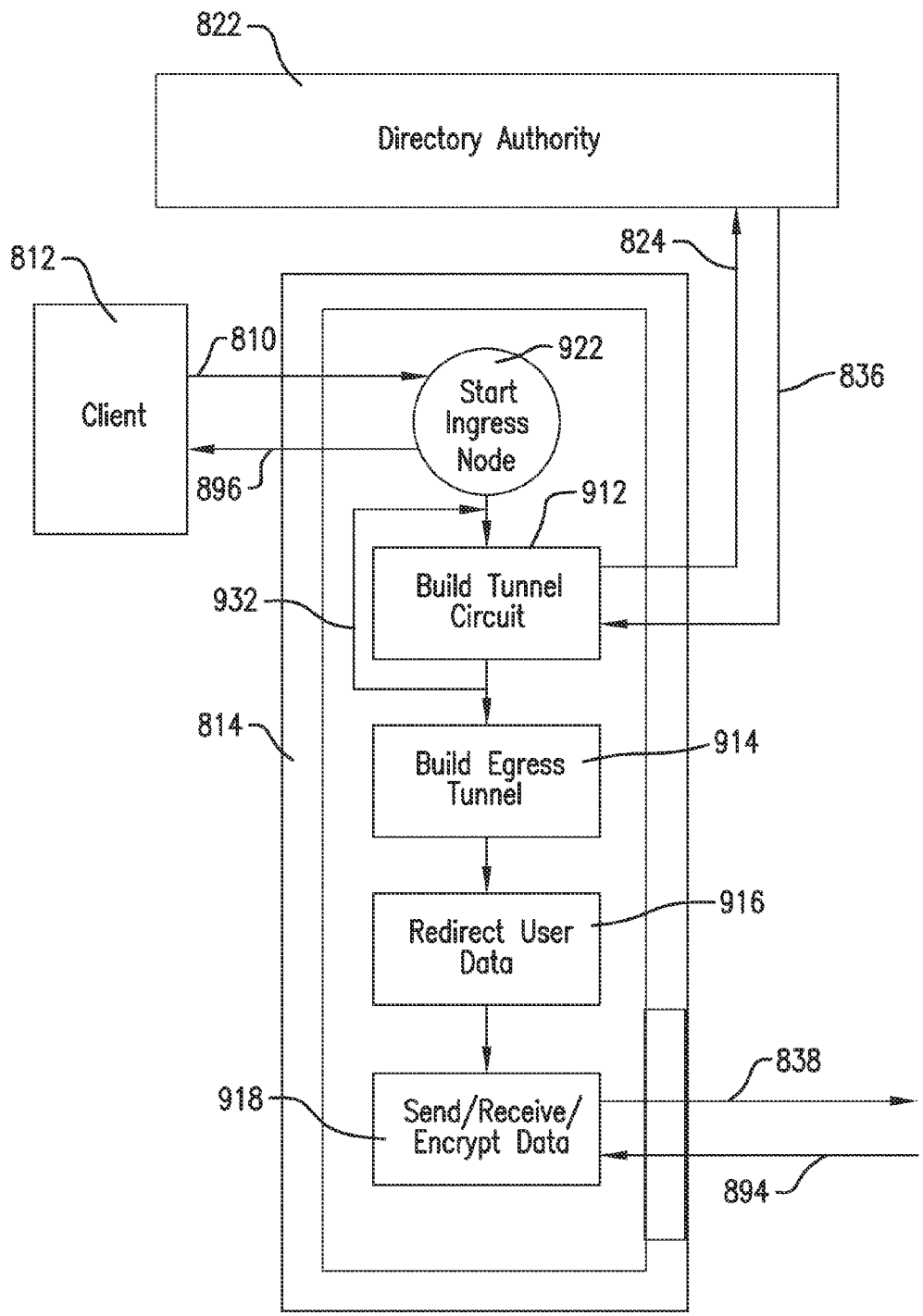
FIG. 9 is a schematic diagram illustrating the operation of a private ingress node of the secure obfuscation network of FIG. 8.

FIG. 9 shows the operation of public-private ingress node 814. Public-private ingress node 814 includes a tunnel circuit builder module 912, an egress tunnel builder module 914, an ingressing user data redirection module 916 and a send/receive module 918. Tunnel circuit builder module 912, egress tunnel builder module 914, ingressing user data redirection module 916 and send/receive module 918 may each comprise hardware and/or software.

Upon receiving the client communication from client 812, public-private ingress node 814 accepts connections from client 812 at step 922. Tunnel circuit builder module 912 builds a tunnel circuit based on information from directory authority node 822. The tunnel circuit is the "outer tunnel" of SON 802 which is a double tunnel of the type shown FIG. 1. Public-Private ingress node 814 introduces itself to directory authority node 822 and queries directory authority node 822, as indicated by arrow 824. Based on the random route path listing of nodes for tunnel circuit 834 created by build tunnel circuit provides possible circuits. Tunnel circuit builder module 912 creates a random path ordering of some or all the valid transit nodes for SON 802 that client communication traverses to get to an egress node, such as public-private egress node 830. Tunnel circuit builder module 912 also forms a connection between each transit node, shown by arrow 840 in FIG. 8. In one embodiment of the present invention, tunnel circuit builder module 912 receives the public keys of each transit node of the tunnel circuit. If the tunnel circuit cannot be built, tunnel circuit builder module 912 attempts to recreate the tunnel circuit again until successful, as indicated by arrow 932.

Upon completion of collecting the public keys and building the tunnel circuit, control passes to egress tunnel builder module 914. The egress tunnel builder module establishes a connection, shown by arrows 838, 840, 842 and 846 between client 812 and server 832. Then send/receive module 918 sends the encrypted traffic through tunnel circuit 834 to public-private egress node 830 where the traffic is decrypted as shown in FIG. 8.

Each of the modules of the public-private ingress node 814 comprises hardware and/or software.

Public-private ingress node 814 may assign a maximum duration for the tunnel circuit or terminate and create a new circuit when a new session is created (whichever comes first). For example, if the public-private ingress node is configured with a maximum duration of one (1) hour to the tunnel circuit, when the tunnel circuit has been active for one (1) hour, the public-private ingress node will rebuild a new tunnel circuit using a new random route path listing.

Figure 10:
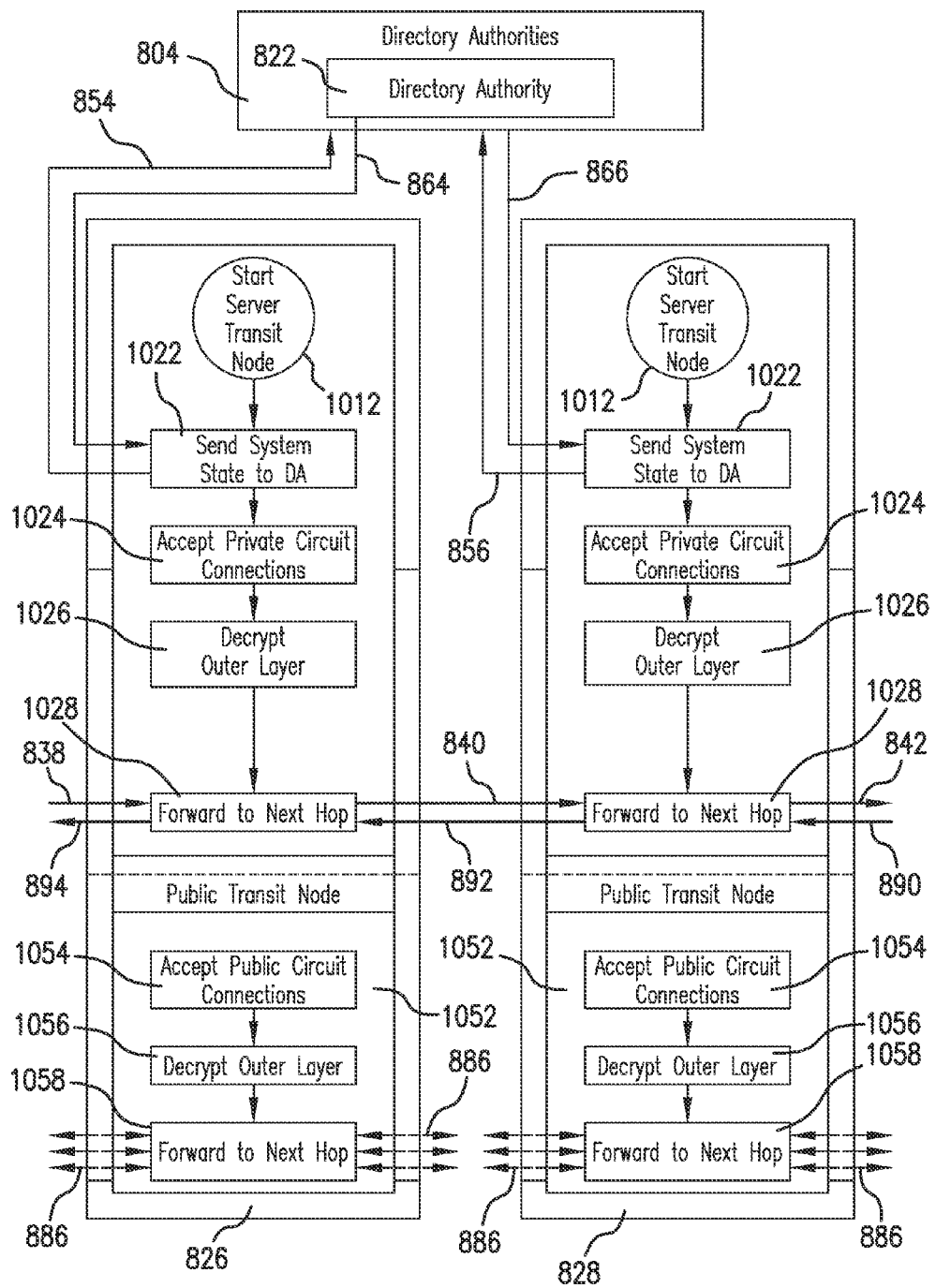
FIG. 10 is a schematic diagram illustrating the operation of two public-private transit nodes of the secure obfuscation network of FIG. 8.

FIG. 10 shows logical data flow for transit nodes 826 and 828. When one of these transit nodes is activated at step 1012, a system state module 1022 of the transit node introduces the transit node to private directory authorities, as indicated by arrows 854 and 856 for transit nodes 826 and 828, respectively. This introduction is necessary for each of the transit nodes to be able to receive obscurity protocol traffic. The information provided by system state module 1022 to the directory authorities 804 during this process includes characteristics such as transit node name, system uptime, bandwidth availability and public key. Once determined to be a legitimate transit node by directory authorities 804, transit nodes, such as transit nodes 826 and 828, will be included in the consolidation data of the cached consensus. Also, once determined to be a valid transit node, a circuit connection acceptance module 1024 of the valid transit node will begin accepting private connections. As tunnel circuit traffic arrives, a decryptor module 1026 decrypts the encrypted outer layer. If this decryption process is successful, the next hop of the packet is determined by forwarding module 1028 and the packet is forwarded to the next hop, as indicated by arrow 840 for the "next hop" from public-private transit node 826 to transit node 828 and as indicated by arrow 842 for the "next hop" from public-private transit node 828 to public-private egress node 830.

As shown in FIG. 10, public-private transit nodes 826 and 828 also each include a public transit node 1052. Public transit node 1052 includes an accept public circuit connections module 1054, a data decryption module 1056 and a forwarding module 1058. Accept public circuit connections module 1054 accepts public circuits that pass through a portion of the transit node allocated to public traffic. Data decryption module 1056 decrypts the outer layer of the public traffic. Forwarding module 1058 then sends data to and receives data from the public circuits connected to the transit node (public-private transit node 826 or 828), as indicated by double-headed arrows 886.

Circuit connections module 1054 includes a component that determines whether a connection is to be accepted or not. This component acts as a throttle if the portion of the node allocated to public traffic needs to be increased to accept more public circuits.

Each of the modules of the public-private transit nodes 826 and 828 comprises hardware and/or software.

Figure 11:
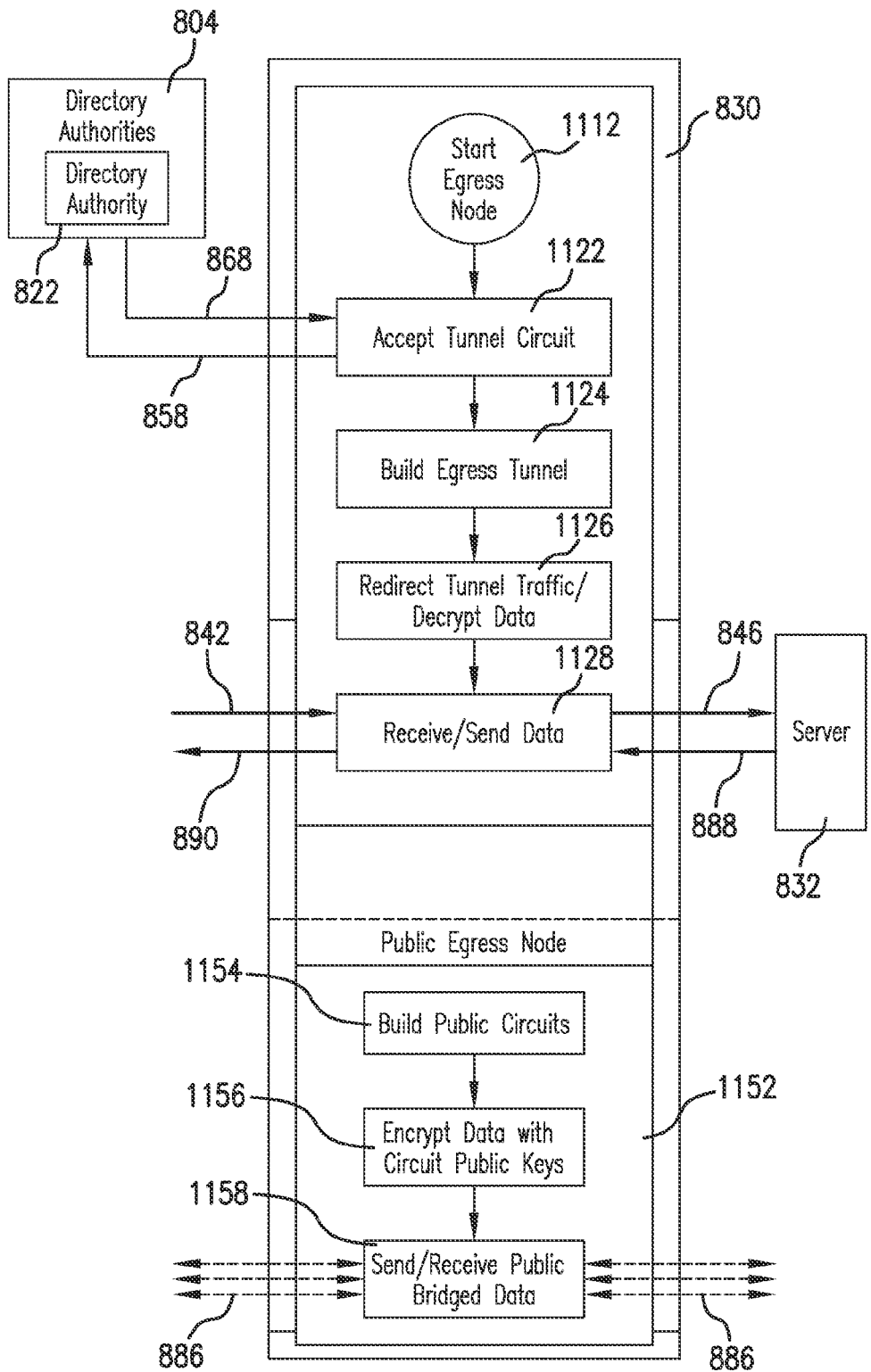
FIG. 11 is a schematic diagram illustrating the operation of a private egress node of the secure obfuscation network of FIG. 8.

FIG. 11 shows logical data flow for public-private egress node 830. When public-private egress node 830 is activated at step 1112, a tunnel circuit screening module 1122 of public-private egress node 830 introduces itself to directory authority node 822 of directory authorities 804 as indicated by arrow 858. Arrow 858 also shows public-private egress node 830 querying directory authority node 822 of directory authorities 804 with a query for cached descriptors for the previous in-line logically adjacent valid transit node, transit node 828 in FIG. 8 to which the current communication is to be sent. In response to this query, directory authority node 822 provides the requested information as indicated by arrow 868. Tunnel circuit screening module 1122 then checks the descriptors of the previous in line logically adjacent transit node for the potential incoming tunnel circuit against the cached descriptors for the previous in line logically adjacent transit node received from directory authority node 822. If public-private egress node 830 will allow the tunnel circuit (tunnel circuit 834 in FIG. 8) to be built, tunnel circuit screening module 1122 will send the public key to public-private ingress node 814 through tunnel circuit 834. Control is then passed to an egress tunnel building module 1124 to begin building the egress tunnel. Egress tunnel building module 1124 also includes a decryption module that decrypts the encrypted traffic from the tunnel circuit to form decrypted traffic. The egress tunnel is the "inner tunnel" of the double tunnel SON 802. Once the egress tunnel is built, egressing traffic redirection module 1126 redirects the decrypted traffic from the tunnel circuit to the egress tunnel A send/receive module 1128 sends the decrypted traffic to a server inside decryptor (such as server inside decryptor 734 of FIG. 7) of server 832 through the egress tunnel.

As shown in FIG. 11, public-private egress node 830 also includes a public egress node 1152 that functions in the same way as public transit node 1052. Public egress node 1152 includes a public circuit building module 1154, a data encryption module 1156 and a send/receive module 1158. Public circuit building module 1154 builds public circuits that pass through a portion of public-private egress node 830 allocated to public traffic. Data encryption module 1156 encrypts the public traffic/data that travels in the public circuit with circuit public keys. Send/receive module 1158 then sends and receives data to public circuits, shown by double-headed arrows 886.

Each of the modules of the public-private egress node 830 comprises hardware and/or software.

Figure 12:
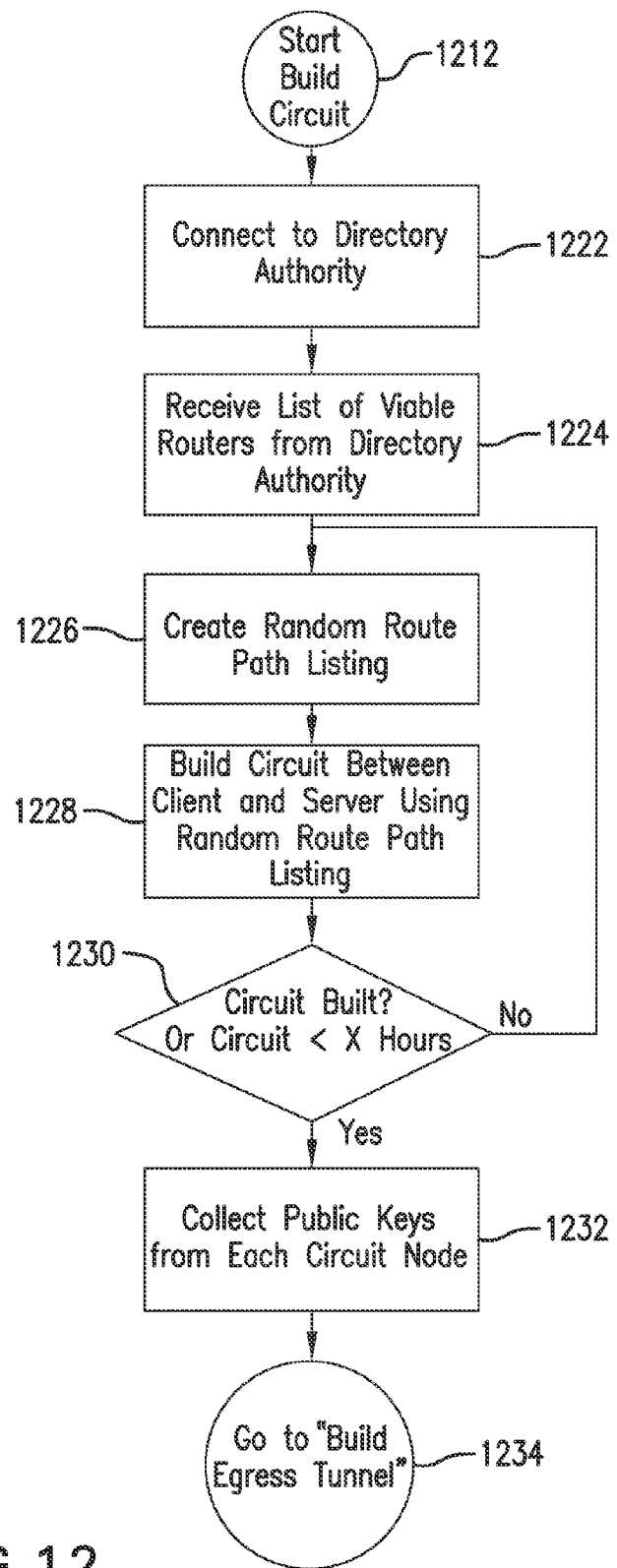
FIG. 12 is a flowchart illustrating the operation of a tunnel circuit builder module of the private ingress node of FIG. 9.

FIG. 12 shows the operation of tunnel circuit builder module 912 of public-private ingress node 814. After activating at step 1212, tunnel circuit builder module 912 connects to directory authority node 822 at step 1222. At step 1224, tunnel circuit builder module 912 receives a random route path listing of valid/viable transit nodes/routers from directory authority node 822. At step 1226, tunnel circuit builder module 912 then creates a random route path listing using at least some of the valid/viable transit nodes by randomly picking which valid transit nodes to hop through based on a random number generator that is part of the operating system for directory authority node 822. The random route path listing will be used to build a tunnel circuit, such as tunnel circuit 834, which is a random path of hops from public-private transit node to public-private transit node through each of the selected public-private transit nodes that will connect public-private ingress node 814 to public-private egress node 830.

Based on the random route path listing, directory authority node 822 provides cached descriptors to public-private egress node 830, as shown by arrow 868, that allow public-private egress node 830 to confirm that public-private transit node 828, the previous in line logically adjacent transit node to public-private egress node 830, is valid. At step 1228, tunnel circuit builder module 912 builds a tunnel circuit between client 812 and server 832 based on the random route path listing. The tunnel circuit is built by each node in the tunnel circuit confirming that the previous in line and next in line logically adjacent nodes to that node are valid. In this way the tunnel circuit is "anonymous" because the information about the entire random route path listing cannot be obtained from directory authority node 822 or from any of the nodes that are part of the random route path listing. Directory authority node 822 does not store the random route path listing, and the nodes that are part of the random route path listing have information about only one or two logically adjacent nodes in the random route path listing.

If, for any reason, the tunnel circuit cannot be built, at step 1230 the tunnel building process returns to step 1226 so the tunnel circuit builder module 912 can create a new random route path listing. Also, if the tunnel circuit has existed beyond its maximum allowed duration (the tunnel circuit has existed for X or more hours), at step 1230 the tunnel building process returns to step 1226 so the tunnel circuit can create a new random route path listing. If the tunnel circuit can be built at step 1230, control is passed to step 1232. Also, for an existing tunnel circuit, if the maximum duration of the tunnel circuit has not been reached (X is less than X hours), control is passed to step 1232. At step 1232, tunnel circuit builder module 912 collects the public keys from each transit node in the tunnel circuit and transfers the public keys to the private ingress node where they are stored on one or more storage media. Control is then passed to egress tunnel builder module 914 at step 1234.

Figure 13:
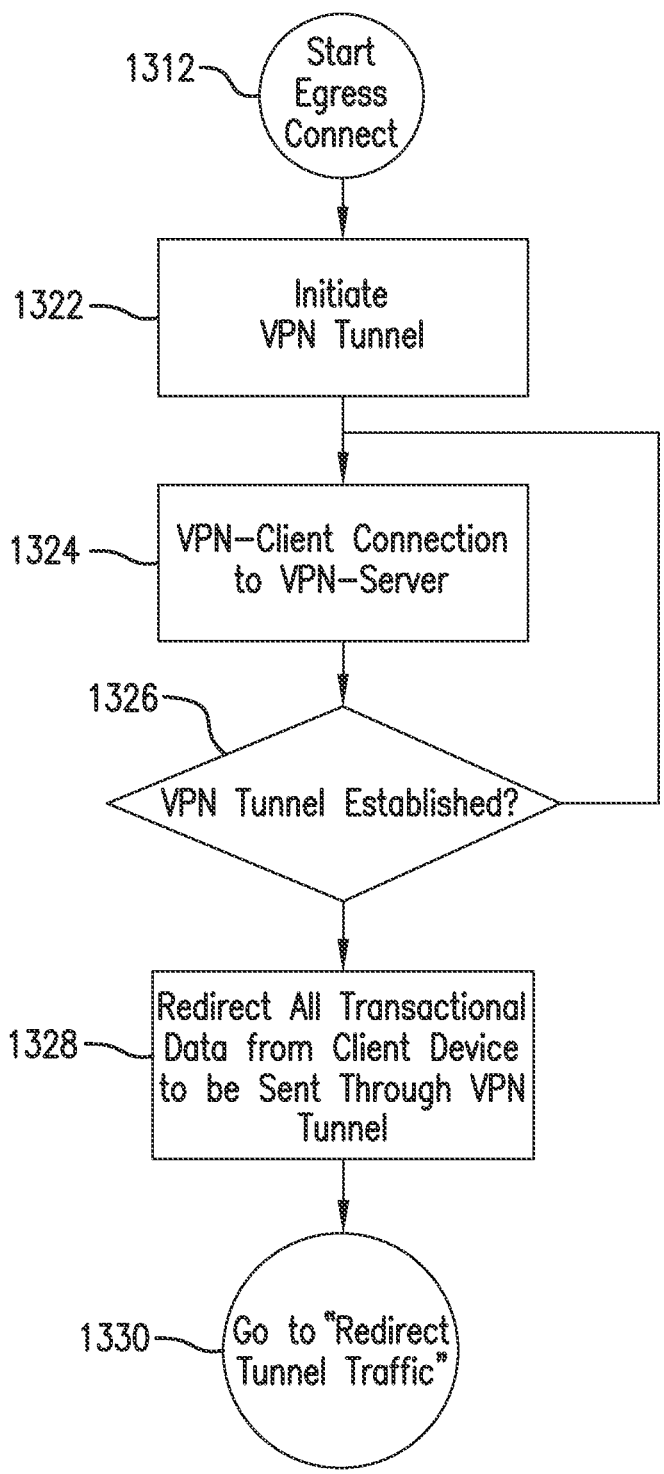
FIG. 13 is a flowchart illustrating the operation of an egress tunnel builder module of the private ingress node of FIG. 9.

FIG. 13 shows the operation of egress tunnel builder module 914 of public-private ingress node 814. After activating at step 1312, at step 1322 egress tunnel builder module 914 initiates an egress tunnel (VPN tunnel). At step 1324, egress tunnel builder module 914 establishes an egress tunnel between client 812 and server 832. At step 1326, if the egress tunnel is not established, control is returned to step 1324, where egress tunnel builder module 914 attempts to once again establish an egress tunnel between client 812 and server 832. Once the egress tunnel is established at step 1326, secure traffic/data from client 812 to be sent to the egress tunnel (VPN tunnel) is redirected/rerouted at step 1328. Control is then passed to ingressing user data redirection module 916 at step 1330.

Figure 14:
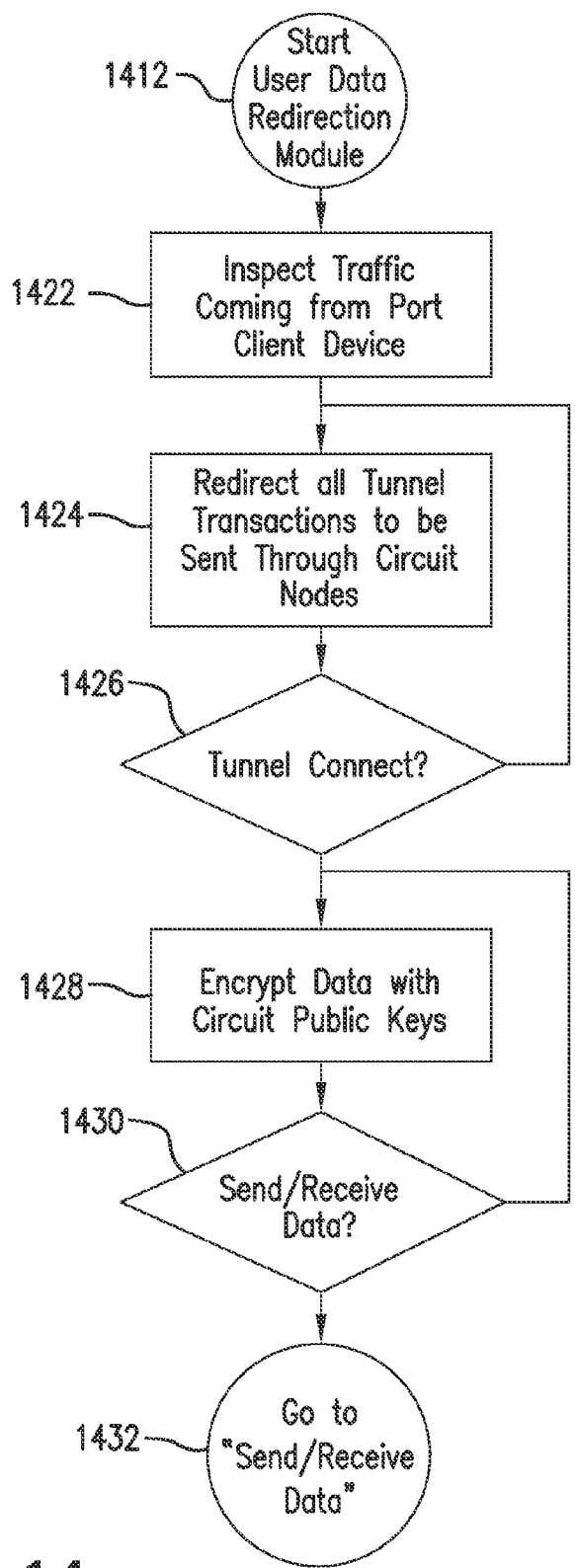
FIG. 14 is a flowchart illustrating the operation of an ingressing traffic redirection module of the private ingress node of FIG. 9.

FIG. 14 shows the operation of ingressing user data redirection module 916 of public-private ingress node 814. After activating at step 1412, ingressing traffic redirection module 916 inspects incoming traffic/data from client 812 at step 1422. At step 1424, ingressing traffic redirection module 916 redirects the traffic/data so that the traffic/data is sent through the tunnel circuit built by tunnel circuit builder module 912. If connection to the tunnel circuit cannot be established by ingressing user data redirection module 916 at step 1426, control is returned to step 1424 and ingressing user data redirection module 916 attempts to reconnect to the tunnel circuit. Once a connection to the tunnel circuit is established at step 1426, the traffic is encrypted by ingressing user data redirection module 916 using the public keys from the transit nodes collected by tunnel circuit builder module 912 at step 1428. If tunnel circuit module 912 determines at step 1430 that there is still additional traffic to encrypt, control is returned to step 1428 until all of the traffic is encrypted. Once all of the traffic is encrypted, control is passed to send/receive module 918 at step 1432.

Figure 15:
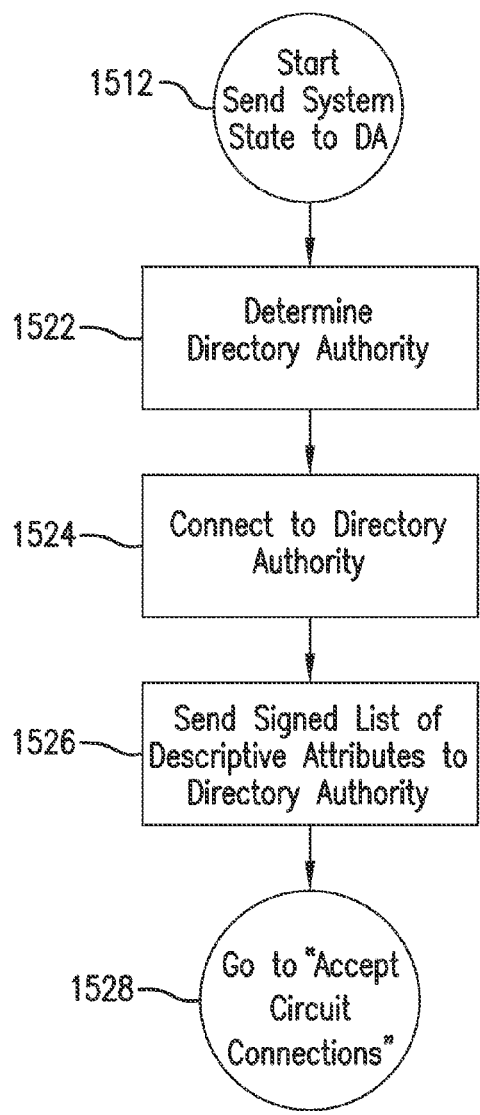
FIG. 15 is a flowchart illustrating the operation of a system state module of one of the public-private transit nodes of FIG. 10.

FIG. 15 shows the operation of system state module 1022 of public-private transit nodes 826 and 828. After activating at step 1512, system state module 1022 determines the directory authority with which the transit node will communicate at step 1522. System state module 1022 then connects to a directory authority, such as directory authority 822, at step 1524. System state module 1022 then sends a list of description attributes to the directory authority at step 1526. The information provided by system state module 1022 to the directory authority during this process includes characteristics such as transit node name, system uptime, bandwidth availability and public key. After providing this information to the directory authority, control passes to circuit connection acceptance module 1024 at step 1528.

Figure 16:
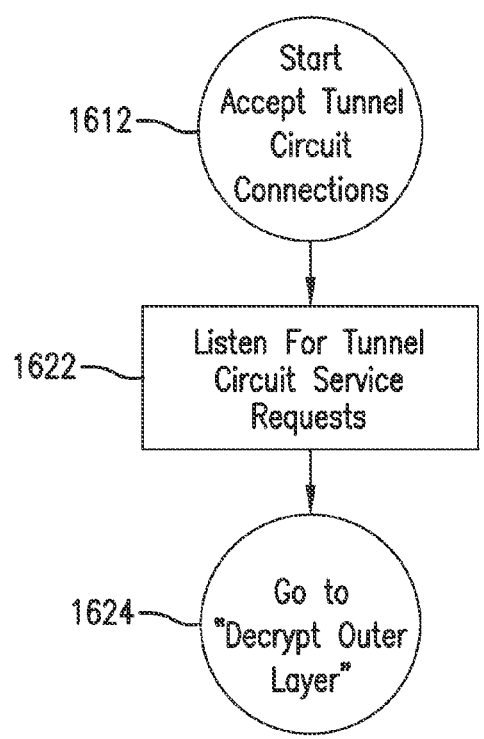
FIG. 16 is a flowchart illustrating the operation of a circuit connection acceptance module of one of the public-private transit nodes of FIG. 10.

FIG. 16 shows the operation of circuit connection acceptance module 1024 of public-private transit nodes 826 and 828. After activating at step 1612, circuit connection acceptance module 1024 "listens," i.e., keeps a port of the transit node (public-private transit node 826 or 828) open for tunnel circuit service requests at step 1622. Upon receiving a tunnel circuit service request at step 1624, control passes to decryptor module 1026 at step 1624.

FIG. 17 shows the operation of decryptor module 1026 of public-private transit nodes 826 and 828. After activating at step 1712, decryptor module 1026 decrypts the tunnel circuit header for an incoming tunnel circuit packet (incoming traffic from the tunnel circuit) at step 1722. Decryptor module 1026 then determines if the tunnel circuit packet is valid at step 1724. If the tunnel circuit packet is not valid, the tunnel circuit packet is discarded at step 1726. If the tunnel circuit packet is valid, control passes to forwarding module 1028 at step 1728.

FIG. 18 shows the operation of forwarding module 1028 of public-private transit nodes 826 and 828. After activating at step 1812, forwarding module 1028 determines the next hop for the tunnel circuit at step 1822. Forwarding module 1028 then determines if the next hop is routable at step 1824. If the next hop is not routable, the tunnel circuit packet is discarded at step 1826. If the tunnel circuit packet is routable, the tunnel circuit packet is forwarded to the next hop at step 1828. The next hop may be to either another transit node or to the egress node for the tunnel circuit. For example, in FIG. 8, the next hop for transit node 826 is transit node 828 and the next hop for transit node 828 is egress node 830.

Figure 19:
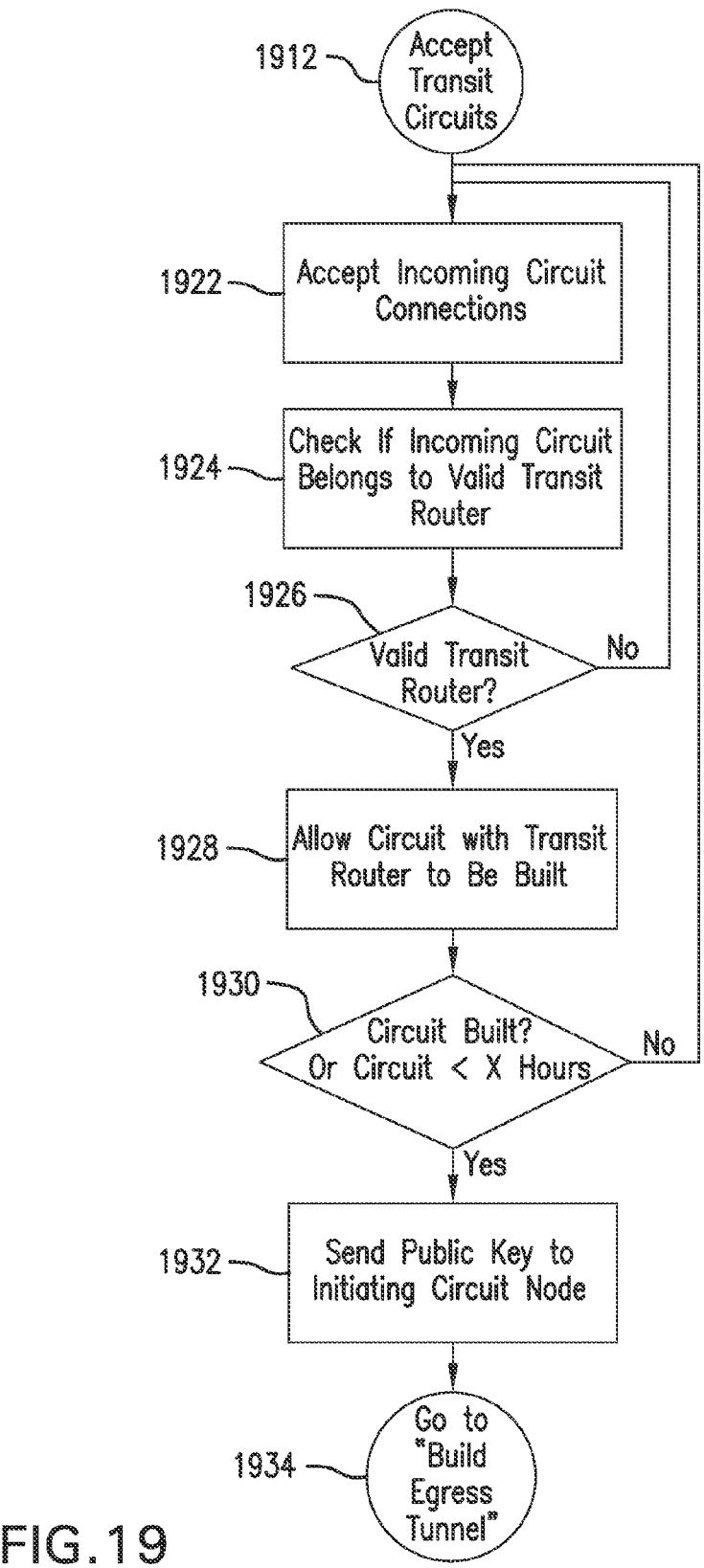
FIG. 19 is a flowchart illustrating the operation of a tunnel circuit screening module of the private egress node of FIG. 11.

FIG. 19 shows the operation of tunnel circuit screening module 1122 of public-private egress node 830. After activating at step 1912, tunnel circuit screening module 1122 of public-private egress node 830 accepts incoming circuit connections at step 1922. Tunnel circuit screening module 1122 then checks an incoming tunnel circuit that includes only valid nodes at step 1924. If one or more of the transit nodes in the incoming tunnel circuit is determined by tunnel circuit screening module 1122 not to be valid at step 1926, control is returned to step 1922. Also, if the tunnel circuit has existed beyond its maximum allowed duration (the tunnel circuit has existed for X or more hours) at step 1926, control is returned to step 1922. If all of the transit nodes in the tunnel circuit determined by tunnel circuit screening module 1122 to be valid at step 1926, the tunnel circuit screening module 1122 allows the tunnel circuit to be built and control is passed to step 1928. Also, for an existing tunnel circuit, if the maximum duration of the tunnel circuit has not been reached (circuit age is less than X hours), control is passed to step 1928. The maximum duration, X hours, may be set using a configuration file. At step 1928, tunnel circuit screening module 1122 sends the public key to public-private ingress node 814 (the initiating circuit node). Control is then passed to egress tunnel building module 1124 at step 1934.

Figure 20:
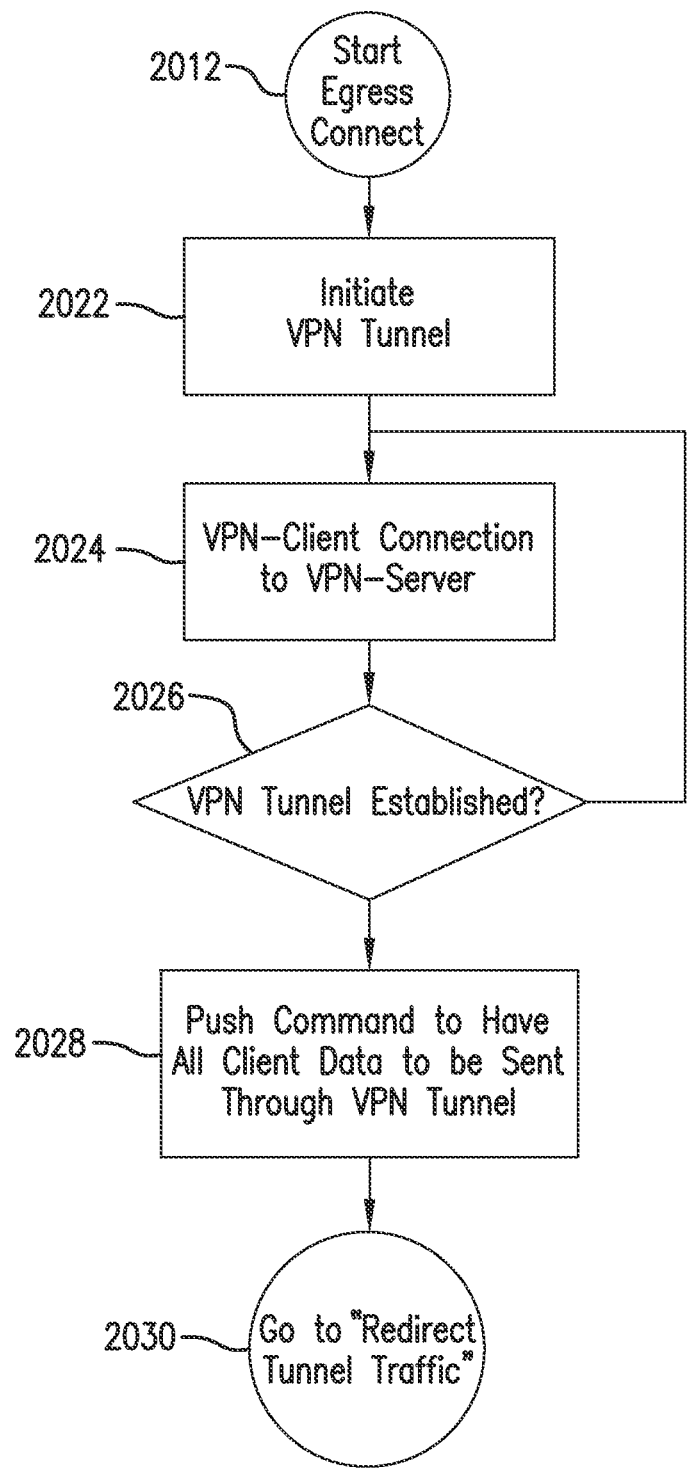
FIG. 20 is a flowchart illustrating the operation of an egress tunnel building module of the private egress node of FIG. 11.

FIG. 20 shows the operation of egress tunnel building module 1124 of public-private egress node 830. After activating at step 2012, egress tunnel building module 1124 of public-private egress node 830 initiates the build process for the VPN tunnel (egress tunnel) at step 2022. Egress tunnel building module 1124 attempts to receive incoming client requests at step 2024. If the egress tunnel connection is determined to be unsuccessful by egress tunnel building module 1124 at step 2026, control returns to step 2022. If the egress tunnel connection is determined to be successful by egress tunnel building module 1124 at step 2026, then at step 2028 egress tunnel building module 1124 pushes instructions on how to redirect the traffic to server 832 back to client 812 through tunnel circuit 834. Control then passes to egressing traffic redirection module 1126 at step 2030.

Figure 21:
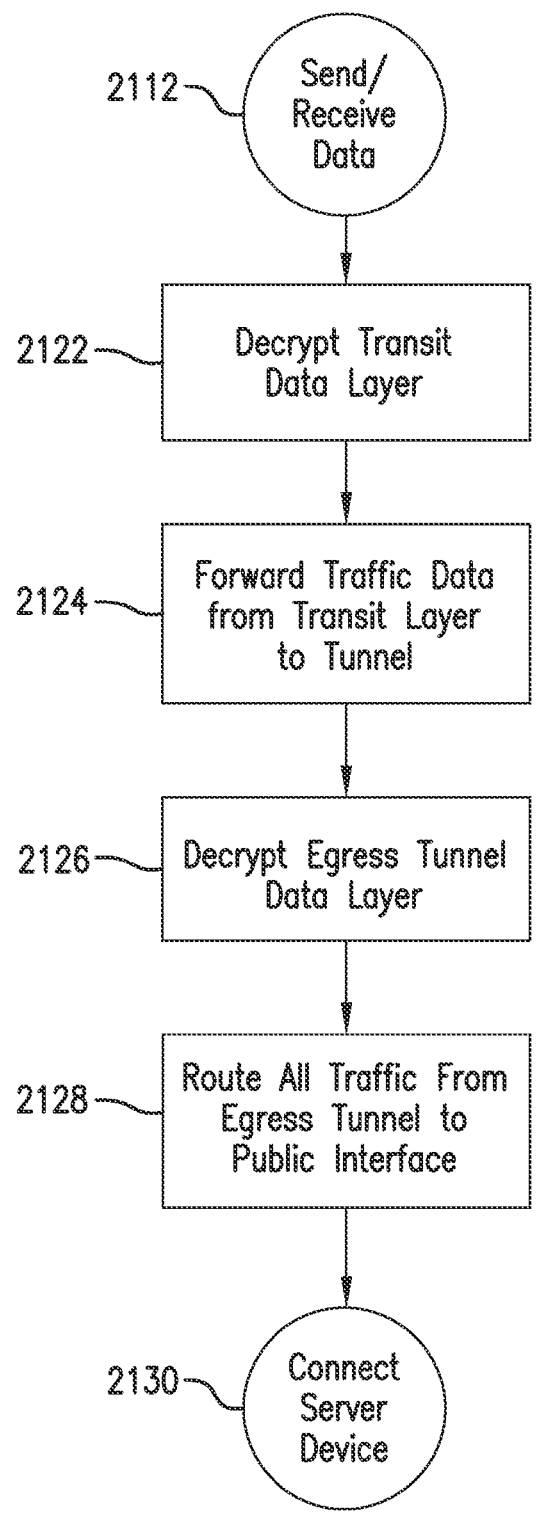
FIG. 21 is a flowchart illustrating the operation of an egressing traffic redirection module and a send/receive module of the private egress node of FIG. 11.

FIG. 21 shows the operation of egressing traffic redirection module 1126 and send/receive module 1128 of public-private egress node 830. After activating at step 2112, egressing traffic redirection module 1126 of public-private egress node 830 decrypts the transit circuit layer (outer-tunnel) at step 2122. After decrypting the transit circuit layer, egressing traffic redirection module 1126 forwards transit circuit packets (traffic) to the egress tunnel at step 2124. Egressing traffic redirection module 1126 then decrypts the packets (inner-tunnel) at step 2126. Egressing traffic redirection module 1126 then routes the traffic from the egress tunnel to send/ receive module 1128 at step 2128. Send/receive module 1128 then communicates with a server device (end device) at step 2130.

While the present invention has been disclosed with reference to certain embodiments, numerous modifications, alterations and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
   an ingress node comprising:
   a tunnel circuit builder module for building a tunnel circuit from the ingress node to an egress node,
   an ingressing user data redirection module for redirecting traffic from a client node to the tunnel circuit and for encrypting traffic to thereby form encrypted traffic,
   a send/receive module for sending traffic to and receiving traffic from the tunnel circuit,
   a private portion for allowing high bandwidth secure private traffic to be received and transmitted by the node on a private pathway through the ingress node, and
   a public portion for allowing low bandwidth secure public traffic to be received and transmitted by the node on a plurality of public pathways through the ingress node,
   wherein the tunnel circuit comprises a random route path through a plurality of randomly selected public-private transit nodes.

2. The device of claim 1, wherein the traffic is encrypted by the ingressing user data redirection module by the using public keys from each of the public-private transit nodes.

3. The device of claim 1, wherein the ingress node is part of a client device comprising the client node.

4. The device of claim 1, wherein the device comprises the tunnel circuit.

5. The device of claim 1, wherein the device comprises the egress node and wherein the egress node comprises:
   an egress tunnel builder module for building an egress tunnel from a client node to a server node,
   an egressing tunnel traffic redirection module for redirecting the encrypted traffic from the tunnel circuit to the egress tunnel and for decrypting the encrypted traffic from the tunnel circuit to thereby form decrypted traffic, and
   a send/receive module for sending the decrypted traffic from the client node to the server node through the egress tunnel.

6. A method comprising the following steps:
   (a) forming a tunnel circuit from an ingress node to an egress node for traffic from a client node connected to the ingress node,
   (b) forming an egress tunnel from the egress node to a server for the traffic, and
   (c) transmitting the traffic from the client node to the egress node,
   wherein the tunnel circuit comprises a random route path through a plurality of randomly selected public-private transit nodes,
   wherein the egress tunnel is an inner tunnel of a double tunnel,
   wherein the tunnel circuit is an outer tunnel of the double tunnel, and
   wherein the ingress node includes a private portion for allowing high bandwidth secure private traffic to be received and transmitted by the ingress node on a private pathway through the node and a public portion for allowing low bandwidth secure public traffic to be received and transmitted by the ingress node on a plurality of public pathways through the ingress node.

7. The method of claim 6, wherein the method comprises the following steps:
   (d) encrypting the traffic prior to the traffic entering the tunnel circuit, and
   (e) encrypting the traffic prior to the traffic entering the egress tunnel.

8. The method of claim 7, wherein the traffic in step (d) is encrypted using public keys from each of the public-private transit nodes.

9. The method of claim 8, wherein the traffic in step (e) is encrypted using public keys from each of the public-private transit nodes.

* * * * *